United States Patent
Iwai et al.

(10) Patent No.: US 9,350,417 B2
(45) Date of Patent: May 24, 2016

(54) WIRELESS TRANSMISSION APPARATUS, WIRELESS RECEPTION APPARATUS, AND WIRELESS COMMUNICATION METHOD

(75) Inventors: Takashi Iwai, Ishikawa (JP); Akihiko Nishio, Osaka (JP); Daichi Imamura, Beijing (CN); Ayako Horiuchi, Kanagawa (JP); Atsushi Matsumoto, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 86 days.

(21) Appl. No.: 14/131,886

(22) PCT Filed: Sep. 14, 2012

(86) PCT No.: PCT/JP2012/005926
§ 371 (c)(1),
(2), (4) Date: Jan. 9, 2014

(87) PCT Pub. No.: WO2013/038716
PCT Pub. Date: Mar. 21, 2013

(65) Prior Publication Data
US 2014/0146770 A1 May 29, 2014

(30) Foreign Application Priority Data
Sep. 16, 2011 (JP) ................................ 2011-203547

(51) Int. Cl.
*H04B 1/715* (2011.01)
*H04L 5/00* (2006.01)
*H04W 28/06* (2009.01)
(Continued)

(52) U.S. Cl.
CPC .............. *H04B 1/715* (2013.01); *H04L 5/0051* (2013.01); *H04L 5/0073* (2013.01); *H04B 1/713* (2013.01); *H04L 5/0012* (2013.01); *H04L 27/2613* (2013.01); *H04W 28/06* (2013.01); *H04W 72/042* (2013.01)

(58) Field of Classification Search
None
See application file for complete search history.

(56) References Cited

U.S. PATENT DOCUMENTS

2010/0074205 A1   3/2010  Papasakellariou et al.
2012/0014320 A1*  1/2012  Nam et al. .................... 370/328
(Continued)

FOREIGN PATENT DOCUMENTS

WO      2010/032963 A2      3/2010

OTHER PUBLICATIONS

3GPP TS 36.211 V10.0, 5.5.3.2, Mapping to physical resources, "Physical Channels and Modulation (Release 10)", Dec. 2010.
(Continued)

*Primary Examiner* — Chi H Pham
*Assistant Examiner* — Soon-Dong D Hyun
(74) *Attorney, Agent, or Firm* — Pearne & Gordon LLP

(57) ABSTRACT

To improve the operation and the effect of ICIC by appropriately limiting resources of a reference signal. An SRS generating unit (154) generates an SRS as a reference signal based on SRS information transmitted from a reception unit (156), and a transmission unit (155) transmits the SRS based on the SRS information transmitted from the reception unit (156). At this time, by using information that represents an SRS drop resource as a transmission drop resource set in advance, the transmission of the SRS from the transmission unit (155) is dropped in a resource in which an SRS transmission resource used for transmitting the SRS is an SRS drop resource.

11 Claims, 22 Drawing Sheets

(51) Int. Cl.
  *H04W 72/04* (2009.01)
  *H04L 27/26* (2006.01)
  *H04B 1/713* (2011.01)

(56) References Cited

U.S. PATENT DOCUMENTS

2012/0263129 A1* 10/2012 Noh et al. .................. 370/329
2013/0010659 A1* 1/2013 Chen et al. ................. 370/280
2013/0208710 A1* 8/2013 Seo et al. ................... 370/336
2013/0315115 A1* 11/2013 Kim et al. ................... 370/280
2014/0003385 A1* 1/2014 Dinan .......................... 370/329
2014/0112277 A1* 4/2014 Yang et al. .................. 370/329

OTHER PUBLICATIONS

3GPP TSG RAN WG1 #63, R1-106053, Samsung, "ICIC Support for SRS Transmissions", Nov. 2010.
3GPP TSG RAN WG1 #66, R1-112521, Samsung, "SRS Enhancements in Rel. 11", Aug. 2011.
International Search Report for PCT/JP2012/005926 dated Nov. 27, 2012.

* cited by examiner

WIRELESS TRANSMISSION APPARATUS, WIRELESS RECEPTION APPARATUS, AND WIRELESS COMMUNICATION METHOD

TECHNICAL FIELD

The present invention relates to a wireless transmission apparatus, a wireless reception apparatus, and a wireless communication method that can be applied to a wireless communication system such as a cellular system.

BACKGROUND ART

In wireless communication systems such as cellular systems, a reference signal (RS) is introduced, which is used for acquiring various indices of a propagation path and a transmission signal. For example, in LTE (Long Term Evolution) and LTE-advanced (Rel. 10) of a next-generation system, which are reviewed in the 3GPP (3rd Generation Partnership Project) that is an international standardization group for mobile communications, an SRS (Sounding Reference Signal) is used as one of reference signals used in an uplink channel. In an uplink channel of a wireless communication system, as the uplink communication, data is transmitted from a transmission apparatus (for example, a terminal (User Equipment: UE)) to a reception apparatus (for example, a base station (e-NodeB; eNB).

"Sounding" refers to an estimation of a channel quality. The SRS is time-multiplexed together with an uplink data symbol and is transmitted for mainly allowing the reception apparatus (for example, a base station) for receiving uplink data to estimate the channel quality of an uplink data channel in the propagation path.

Hereinafter, an example of a method of transmitting an SRS will be described (see Non-Patent Literature 1). In this example, a transmission apparatus (for example, a terminal) for an uplink channel transmits an SRS in a narrow band while chancing a transmission frequency band in a predetermined time, and a reception apparatus for the uplink channel performs sounding of a wide band using several narrow-band SRSs.

FIG. 1 is a diagram that illustrates an example of a method of transmitting an SRS using frequency hopping described in Non-Patent Literature 1. In each cell of the wireless communication system, as a transmission band (narrow band) for the SRS, one of four transmission bandwidths (SRS hopping BW: b=0 to 3 in FIG. 1) can be set to a terminal. In addition, as a frequency hopping range, one of the above-described SRS BWs (SRS Hopping BW=$b_{hop}$=0 to 3 in the drawing) can be set.

As SRS parameters used for setting a frequency range, an initial transmission band position is set together with the SRS transmission bandwidth b and the frequency hopping range $b_{hop}$ described above. By substituting these SRS parameters into a predetermined equation that represents a hopping pattern (the amount of change in frequency), the SRS transmission band at each transmission timing at the time of performing frequency hopping is determined.

In addition, in a case where the SRS transmission bandwidth of a terminal is set to be equal to or larger than the frequency hopping range (in other words, b≤$b_{hop}$), the frequency hopping is not applied to the terminal. As above, in a conventional method of transmitting an SRS, the frequency hopping of continuous frequency bands can be set.

On the other hand, in the next version of LTE-Advanced (Rel. 11), in order to further improve the capacity of a communication channel, a Heterogeneous Network (HetNet: Heterogeneous Network) using a plurality of base stations having mutually different coverage areas is under review. More specifically, for example, the operation of a HetNet is under review in which a pico cell (also called a Low Power Node (LPN) or a low-power Remote Radio Head (RRH)) is arranged within a coverage area of a macro cell (also called a High Power Node (HPN)).

In such a HetNet environment, the interference (uplink channel interference) from a terminal (hereinafter referred to as a macro terminal (Macro UE) that is controlled by the base station (Macro eNB) of the macro cell to a terminal (hereinafter, referred to as a pico terminal (Pico UE)) that is controlled by the base station (Pico eNB) of the pico cell becomes a problem.

FIG. 2 is a diagram that illustrates an example of uplink channel interference in the HetNet environment. It is necessary for an uplink transmission signal of the macro terminal (Macro UE) 11 to be received at an appropriate level by the base station 12 (Macro eNB) of the macro cell 10. Accordingly, as the uplink transmission power of the macro terminal 11, power that is used for compensating for a path loss between the macro terminal 11 and the base station 12 of the macro cell 10 is set. On the other hand, as the uplink transmission power of the pico terminal (Pico UE) 21, power that is used for compensating for a path loss between the pica terminal 21 and the base station (Pico eNB) 22 of the pica cell 20 is set.

Here in a case where the macro terminal 11 is located in an area located near the cell edge of the macro cell 10 (hereinafter, referred to as a cell edge area), or in a case where the macro terminal 11 is located behind an obstacle such as a building at which it is difficult to receive a direct wave from the base station 12 of the macro cell 10, or in other cases, the path loss between the macro terminal 11 and the base station 12 of the macro cell 10 is large.

At this time, it is assumed that the uplink transmission power of the macro terminal 11 is higher than the uplink transmission power of the pico terminal 21. In other words, in such circumstances, there is a possibility that an uplink transmission signal of the macro terminal 11 becomes a significant interference factor for the uplink transmission signal of the pica terminal 21. Especially, in a case where the macro terminal 11 is located near the pica cell 20, the influence of the uplink channel interference will further increase.

CITATION LIST

Non-Patent Literature

Non-Patent Literature 1: 3GPP TS 36211 V10.0, 5.5.3.2, Mapping to physical resources, "Physical Channels and Modulation (Release 10)"

Non-Patent Literature 2: 3GPP TSG RAN WG1 #63, R1-106053, Samsung, "ICIC Support for SRS Transmissions", November 2010

SUMMARY OF INVENTION

Technical Problem

As a countermeasure for interference under the HetNet environment, inter-cell interference control (ICIC: Inter-Cell Interference Control) may be considered, in which the use of transmission resources assigned for transmission is limited for cells that serve as interference sources. From this, since an interference signal is not transmitted in the limited transmission resources from a cell that serves as an interference source, a cell that may otherwise receive interference can be configured not to receive interference. As the limit of the transmission resources, a resource limitation in the frequency region, a resource limitation in the time domain, and the like can be considered.

As an example of the ICIC, inter-cell interference control performed in the frequency domain (hereinafter, referred to as "frequency-domain ICIC") is under review, in which the interference to a pico cell is reduced by limiting, a transmission band, which is a frequency band used by a macro terminal for transmission as a countermeasure for uplink channel interference. For example, in Non-Patent Literature 2, a non-continuous allocation of the transmission bands of a macro terminal is under review.

FIG. 3 is a diagram that illustrates an example of the frequency domain ICIC in an uplink channel. In FIG. 3, by allocating transmission band 31 of a macro terminal, which are represented by dots in FIG. 3, to be non-continuous, the macro terminal can transmit an uplink signal in a broad bandwidth in a discrete manner, and whereby the gain of a frequency diversity can be acquired. On the other hand, in a pico cell, by scheduling the frequency band that is not used by the macro terminal for transmission for an uplink signal to the uplink signal of the pico terminal (in other words, by assigning a frequency band that is not used by the macro terminal for transmission for an uplink signal as a band used by the pico terminal for transmitting an uplink signal), the influence of the interference from the macro terminal can be suppressed.

In addition, as another example of the ICIC, in a downlink channel of LTE-advanced, inter-cell interference control performed in the time domain (hereinafter referred to as "time-domain ICIC") using an ABS (Almost Blank Subframe) is supported. The ABS is a subframe in which a downlink signal is not transmitted from the base station. In the time-domain ICIC of the downlink channel, by arranging the ABS at predetermined timing by using the base station of the macro cell, the performance deterioration due to downlink channel interference to a pico cell located on the periphery of the macro cell is suppressed.

However, in a conventional setting method used for performing the ICIC, since there is a restriction on a setting pattern of transmission resources that can be set, there is a case where appropriate resource limitation cannot be set. Accordingly, there is a problem in that the effect of the application of the ICIC is limited. For example, in a case where the frequency-domain ICIC is applied, when the conventional frequency hopping setting method of an SRS, which is illustrated in FIG. 1, is used, the transmission band of the SRS is limited to continuous narrow bands. Accordingly, for a transmission band that is assigned, there is a problem in that it is difficult to apply the frequency-domain ICIC of the uplink channel. In addition, there is also a possibility of a similar problem occurring in any one of the frequency domain of the downlink channel, the time domain of the uplink channel, and the time domain of the downlink channel.

The present invention is devised in view of the above-described situations and provides a wireless transmission apparatus, a wireless reception apparatus, and a wireless communication method capable of increasing the effect of the application of the ICIC by appropriately limiting the resources of a reference signal.

Solution to Problem

A wireless transmission apparatus of the present invention may include: a reception unit that receives information representing a transmission drop resource that has been set; a reference signal generating unit that generates a reference signal; and a transmission unit that transmits the reference signal in a transmission resource that is not the transmission drop resource among one or more transmission resources used for transmitting the reference signal.

A wireless reception apparatus of the present invention may include a reception unit that receives a reference signal; and a channel estimating unit that performs channel estimation by using the received reference signal, when a transmission resource that is used for transmitting the reference signal is not a transmission drop resource that has been set.

A wireless communication method of the present invention may include receiving information that represents a transmission drop resource that has been set; transmitting a reference signal in a transmission resource that is not the transmission drop resource among the one or more transmission resources used for transmitting the reference signal.

A wireless communication method of the present invention may include receiving a reference signal; performing channel estimation by using the received reference signal, when a transmission resource that is used for transmitting the reference signal is not the transmission drop resource that has been set.

Advantageous Effects of Invention

By employing the above-described configuration of the present invention, the resources of a reference signal can be appropriately limited, and accordingly, the effect of the application of the ICIC can increase.

MODES FOR CARRYING OUT INVENTION

Figure 1:
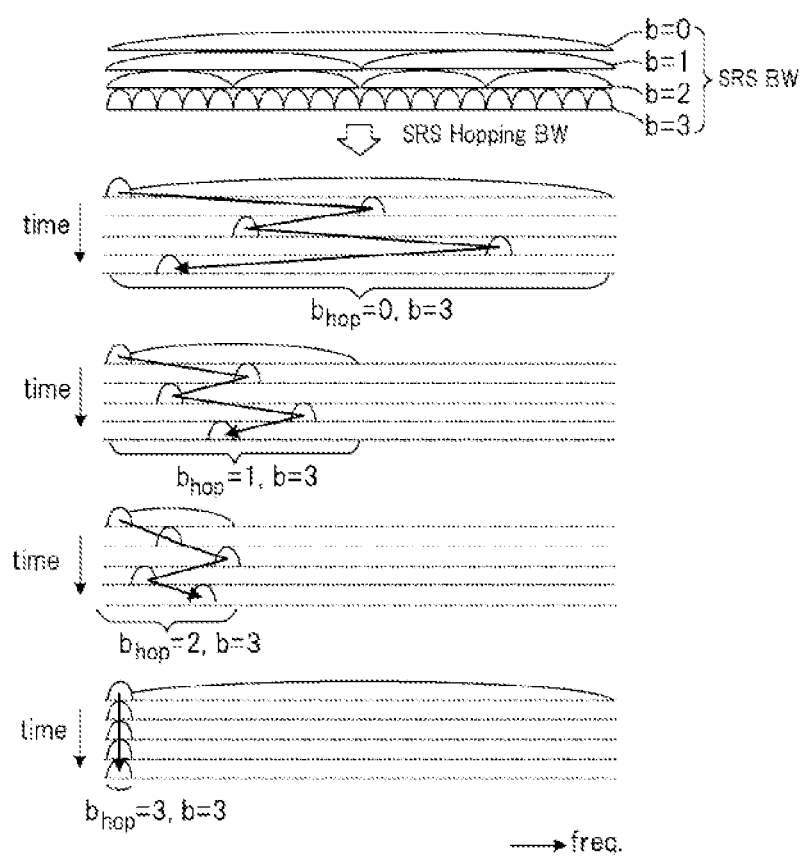
FIG. 1 is a diagram that illustrates an example of a method of transmitting an SRS using frequency hopping described in Non-Patent Literature 1.

In the transmission drop resource among the one or more transmission resources, the transmission unit may drop the transmission of the reference signal in the transmission drop resource, when it is determined that the interference caused by the wireless transmission apparatus is high based on a determination criterion.

The determination criterion may define that the interference caused by the wireless transmission apparatus is determined to be high when a transmission bandwidth of the reference signal of the wireless transmission apparatus is below a threshold value.

The determination criterion may define that the interference caused by the wireless transmission apparatus is determined to be high when the wireless transmission apparatus is located in a cell edge area.

The determination criterion may define that the interference caused by the wireless transmission apparatus is determined to be high when a path loss between the wireless transmission apparatus and a wireless reception apparatus is above a threshold value.

The determination criterion may define that the interference caused by the wireless transmission apparatus is determined to be high when a power headroom of the transmission signal of the wireless transmission apparatus is below a threshold value.

The transmission drop resource may be a transmission drop band that represents a frequency band in which transmission of the reference signal is to be dropped or a transmission drop subframe that represents a subframe in which the transmission of the reference signal is to be dropped.

The transmission drop band may be represented by a bit sequence indicative a position of a transmission band that is available for the wireless transmission apparatus.

The transmission drop resource may be a transmission drop band that represents a frequency band in which transmission of the reference signal is to be dropped, the threshold value is derived from a bandwidth of the transmission drop band.

The transmission unit may transmit the reference signal in a second transmission band which is a transmission band that is assigned after a next transmission subframe of the reference signal and does not coincide with the transmission drop band, in a case where a first transmission band for the reference signal coincides with a transmission drop band as the transmission drop resource that represents a frequency band in which the transmission of the reference signal is dropped or in a case where the first transmission band for the reference signal coincides with the transmission drop band and the interference caused by the wireless transmission apparatus is determined to be high based on a determination criterion.

The transmission drop subframe may be a subframe that is after four subframes from a downlink ABS (Almost Blank Subframe).

The channel estimating unit may drop the channel estimation when the transmission resource is the transmission drop resource and the interference caused by the wireless transmission apparatus is determined to be high based on a determination criterion.

The wireless reception apparatus of the present invention may further comprise a transmission unit configured to transmit a transmission drop information indicating a drop of the transmission of the reference signal in the transmission drop resource to the wireless transmission apparatus.

Figure 2:
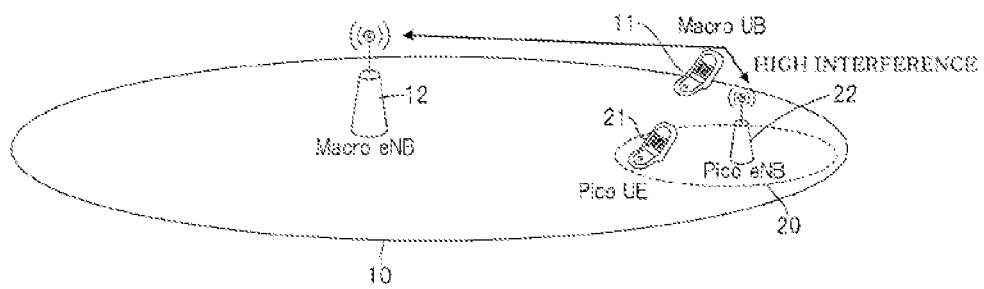
FIG. 2 is a diagram that illustrates uplink channel interference under a HetNet environment.
Figure 3:
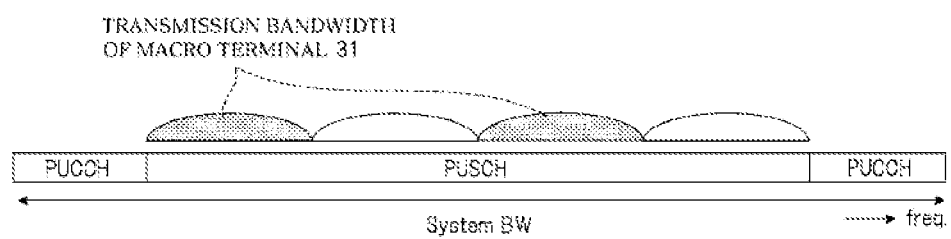
FIG. 3 is a diagram that illustrates air example of frequency-domain ICIC in an uplink channel.

In embodiments, examples are presented in a case where a wireless transmission apparatus, a wireless reception apparatus, and a wireless communication method according to the present invention are applied to a cellular system for mobile communication such as a cellular phone. In the description presented below, an uplink channel in a wireless communication system is assumed. Further, a case is illustrated as an example in which a terminal (UE: User Equipment) of a mobile station serves as a wireless transmission apparatus (hereinafter, referred to as a "transmission apparatus"), and a base station (BS) serves as a wireless reception apparatus (hereinafter, referred to as a "reception apparatus"). As a terminal, a macro terminal under a HetNet environment, which is as illustrated in FIG. 2, is assumed, and an example will be described in a case where an SRS, which is a reference signal used for estimating the channel quality, is transmitted in an uplink channel from the macro terminal to the base station of the macro cell. In the description presented below, the macro terminal is simply referred to as a "terminal" when appropriate, and the base station of the macro cell is simply referred to as a "base station" when appropriate.

As a first example of a countermeasure for uplink channel interference under the HetNet environment, a case will be described in which frequency-domain ICIC is applied to an SRS that is transmitted by the macro terminal.

For example, as methods for increasing the effect of the application of the frequency-domain ICIC using frequency hopping of an SRS illustrated in FIG. 1 when the frequency-domain ICIC is performed, there are the following methods.

Figure 4:
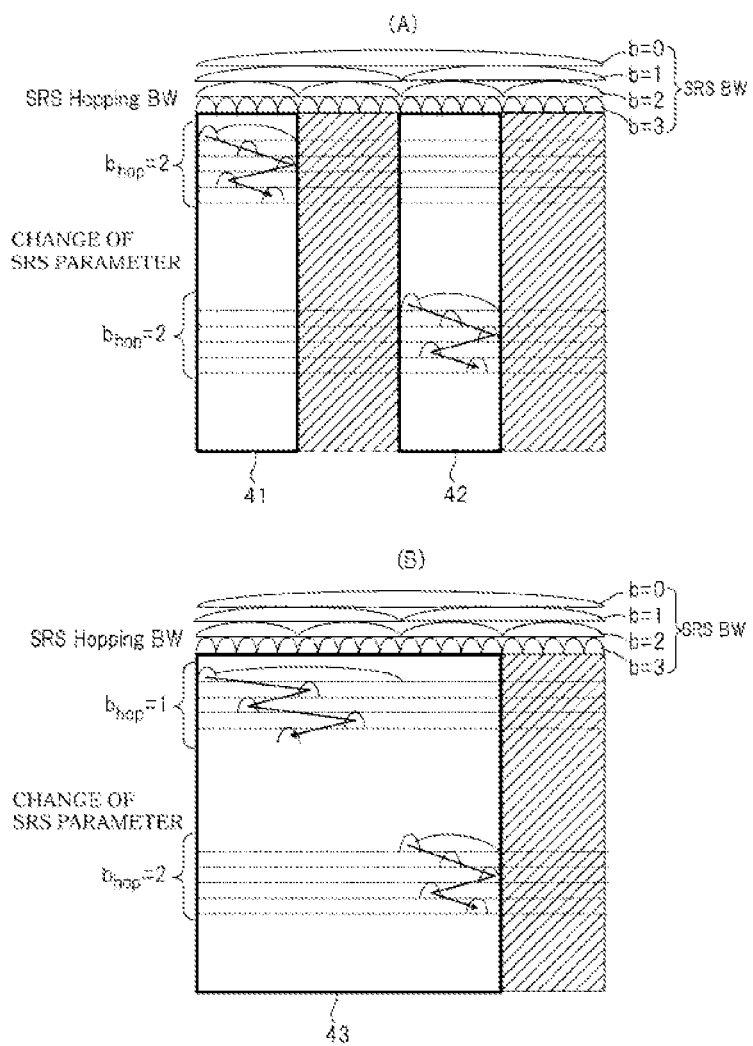
FIG. 4 is a diagram that illustrates an application example of frequency-domain ICIC in SRS transmission, in which (A) is a diagram that illustrates a case were an SRS is transmitted in non-continuous bands, and (B) is a diagram that illustrates a case where an SRS is transmitted by using one transmission band comprised of a plurality of continuous bands.

FIG. 4 is a diagram that illustrates an application example of frequency-domain ICIC in SRS transmission, FIG. 4(A) illustrates a case where an SRS is transmitted in non-continuous bawls, and FIG. 4(B) illustrates a case where an SRS is transmitted by using one transmission band comprised of a plurality of continuous bands. The base station transmits SRS parameters to the terminal and the terminal transmits an SRS to the base station in a predetermined band that is indicated by the SRS parameters. As the limit of transmission resources, non-transmission bands in which an SRS is not transmitted, as illustrated by diagonal lines in the drawings, are non-continuous (in other words, two non-transmission bands are discrete in the frequency direction) in the case of FIG. 4(A) and the non-transmission bands are continuous (in other words, one non-transmission band or a non-transmission band comprised of a plurality of non-transmission bands is present) in the case of FIG. 4(B).

In this case, in any of the non-continuous bands 41 and 42 as illustrated in FIG. 4(A) and a plurality of continuous bands 43 as illustrated in FIG. 4(B), the base station cannot set an SRS transmission band of non-continuous bands or a plurality of continuous bands by using one SRS parameter. Accordingly, the base station needs to change the SRS parameter setting for each transmission band that can be set by one SRS parameter. Therefore, signaling from the base station to the terminal increases.

In other words, as illustrated in FIGS. 4(A) and 4(B), in a case where the terminal transmits an SRS to the base station in the non-continuous bands 41 and 42 of two narrow bands (two clusters) or in the continuous band 43, the base station needs to transmit to the terminal an SRS parameter twice in which the initial transmission band position is changed and the terminal needs to set the SRS transmission band every time when receiving the SRS parameters. In the specification of LTE, the SRS parameter (more specifically, Sounding RS-UL-Config Dedicated (see 3GPP TS 36.331)) has an information amount of 24 bits for each transmission. The notification of the SRS parameter to the terminal twice causes an increase in the overhead of the system and causes the deterioration of the throughput performance.

Accordingly, in the present embodiment, as a transmission drop resource, an SRS transmission drop resource (SRS drop resource) that drops the transmission of an SRS is provided, and a resource for which the transmission of an SRS is not performed is set. Accordingly, the limitation of the set pattern of the transmission resources at the time of performing the ICIC is cancelled, and the effect of the application of the ICIC can increase.

The transmission drop resource includes at least one of a transmission drop band that represents the frequency band in which the transmission of a reference signal is dropped and a transmission drop subframe that represents a subframe in which the transmission of a reference signal is dropped. In other words, the SRS transmission drop resource, to be described later in detail, can be applied to not only a transmission band in the frequency domain but also a transmission subframe, a transmission frame, a transmission slot, or the like in the time domain. Accordingly, the SRS transmission drop resource can be applied not only to the above-described frequency-domain ICIC but also to any case such as time-domain ICIC, or a combination of frequency-domain ICIC and time-domain ICIC, etc.

First Embodiment

In the first embodiment, a basic configuration of a base station and a terminal that perform the ICIC using the SRS drop resource will be explained.

<Configuration and Function of Base Station>

Figure 5:
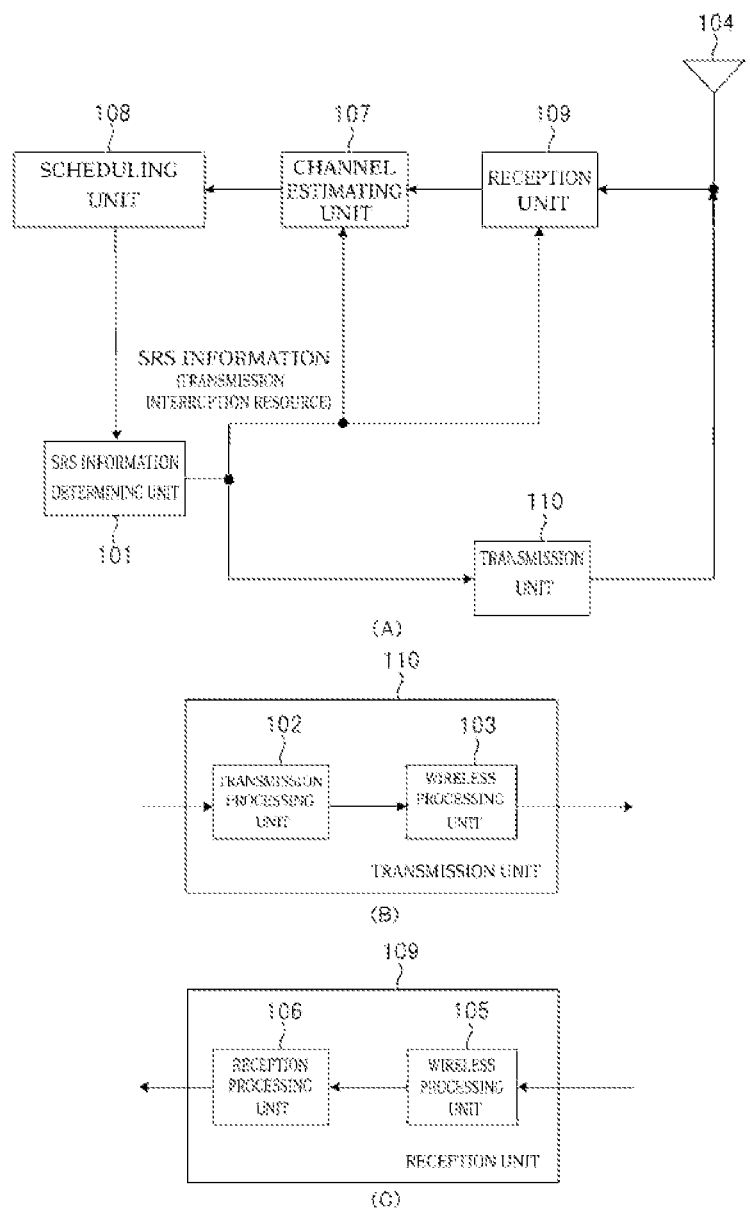
In FIG. 5, (A) to (C) are block diagrams that illustrate a main configuration of a base station (reception apparatus) of a macro cell according to a first embodiment.

FIG. 5 is a block diagram that illustrates a main configuration of a base station (reception apparatus) of a macro cell according to the first embodiment.

As illustrated in FIG. 5(A), the base station of the macro cell that serves as a reception apparatus in an uplink channel includes an SRS information determining unit 101, a transmission unit 110, an antenna 104, a reception unit 109, a channel estimating unit 107, and a scheduling unit 108.

The SRS information determining unit 101 determines SRS information as control information relating to SRS transmission for a terminal (macro terminal) that is present in the macro cell. For example, an SRS parameter that includes an SRS transmission subframe, an SRS transmission band, an SRS transmission bandwidth, a CS (Cyclic Shift) amount, a transmission comb, a frequency hopping pattern, and the like is determined as the SRS information. The transmission comb represents the positions of comb-shaped sub carriers in an IFDMA (Interleaved frequency-division multiple-access).

In addition, the SRS information determining unit 101 determines an SRS transmission drop resource (hereinafter, referred to as an SRS drop resource) that drops SRS transmission as a part of the SRS information. The SRS drop resource includes at least one of an SRS transmission drop band (hereinafter, referred to as an SRS drop band) that represents a frequency band in which the SRS transmission is dropped and an SRS transmission drop subframe (hereinafter, referred to as an SRS drop subframe) that represents a subframe in which the SRS transmission is dropped. In a case where the SRS drop resource represents the SRS drop band, the SRS transmission in a frequency band that is the SRS drop band in the wireless resource is stopped. In a case where the SRS drop resource represents the SRS drop subframe, the SRS transmission in a subframe that is the SRS drop subframe in the wireless resource is stopped.

The SRS information determining unit 101 outputs the determined SRS information to the transmission unit 110, the reception unit 109, and the channel estimating unit 107. The SRS drop resource information is unique information within a cell and may be information that is common to all the macro terminals within the cell. Alternatively, the SRS drop resource information may be terminal-specific information.

The SRS information that is generated by the SRS information determining unit 101 is transmitted to a terminal, which is a setting target, as control information of an RRC layer in the case of the terminal-specific information or as system control information in the case of cell-specific information (common to all the terminals). In the case of the cell-specific information, by setting an SRS drop resource that is common to all the terminals the effect of the ICIC is acquired, and the SRS drop resource information can be signaled to all the terminals within the cell in the same way, whereby the overhead of the system can be reduced. On the other hand, in the case of the terminal-specific information, an SRS drop resource that is necessary for reducing the influence of the interference to a cell located on the periphery can be set for each terminal, and accordingly, the effect of the system performance improvement through the ICIC can be further improved.

The transmission unit 110 transmits the SRS information received from the SRS information determining unit 101, or a transmission signal including the SRS information.

In addition, the transmission unit 110, for example, as illustrated in FIG. 5(B), may include a transmission processing unit 102 and a wireless processing unit 103.

The transmission processing unit 102 can generate a transmission signal by mapping the SRS information transmitted from the SRS information determining unit 101 into a predetermined downlink wireless resource. In addition, before mapping, the SRS information ma be encoded and/or modulated.

The wireless processing unit 103 performs a wireless transmission process for the transmission signal as is necessary and performs power amplification of the transmission signal so as to have predetermined transmission power. Then, the wireless processing unit 103 transmits the transmission signal through the antenna 104. As examples of the wireless transmission process, there may be up-converting, digital-to-analog (D/A) conversion, and the like of the transmission signal.

The reception unit 109 outputs the received SRS or the SRS included in the received wireless signal to the channel estimating unit 107. In addition, the reception unit 109, for example, as in FIG. 5(C), may include a wireless processing unit 105 and a reception processing unit 106.

The wireless processing unit 105 may perform a wireless reception process as necessary for the wireless signal that is received through the antenna 104. As examples of the wireless reception process, there may be down-converting, analog-to-digital (A/D) conversion, or the like of a reception signal.

The reception processing unit 106 may extract an SRS transmitted from a terminal, which has been received by the base station, based on the SRS information transmitted from the SRS information determining unit 101.

The channel estimating unit 107 calculates a channel estimation value (SINR measured value) in the base station by performing a correlation operation on the SRS, which is transmitted from the reception unit 109, with a replica signal and outputs the channel estimation value to the scheduling unit 108.

At this time, the channel estimating unit 107 determines whether or not the resource of the SRS reception or the resource of the reception signal is an SRS drop resource based on the SRS information that is transmitted from the SRS information determining unit 101. In a case where the resource of the SRS reception or the resource of the reception signal is determined to be the SRS drop resource, and it is determined that an SRS has not been transmitted from the terminal, channel estimation is not performed. In this case, the channel estimating unit 107 outputs a content indicating that channel estimation is not performed on the resource to the scheduling unit 108.

Alternatively, in a case where the resource of the SRS reception or the resource of the reception signal is the SRS drop resource, and it is determined that an SRS has not been transmitted from the terminal, the channel estimating unit 107 discards the channel estimation value, and outputs a content indicating that the channel estimation value in the corresponding resource is invalidated to the scheduling unit 108.

The scheduling unit 108 performs scheduling of terminals present within the cell based on the channel estimation value that is derived from the received SRS. As examples of the scheduling, there are assignment of resources to data or the SRS, a modulation scheme and/or control of an encoding ratio, and the like. The scheduling unit 108 outputs the scheduled information to the SRS info determining unit 101.

<Configuration and Function of Terminal>

Figure 6:
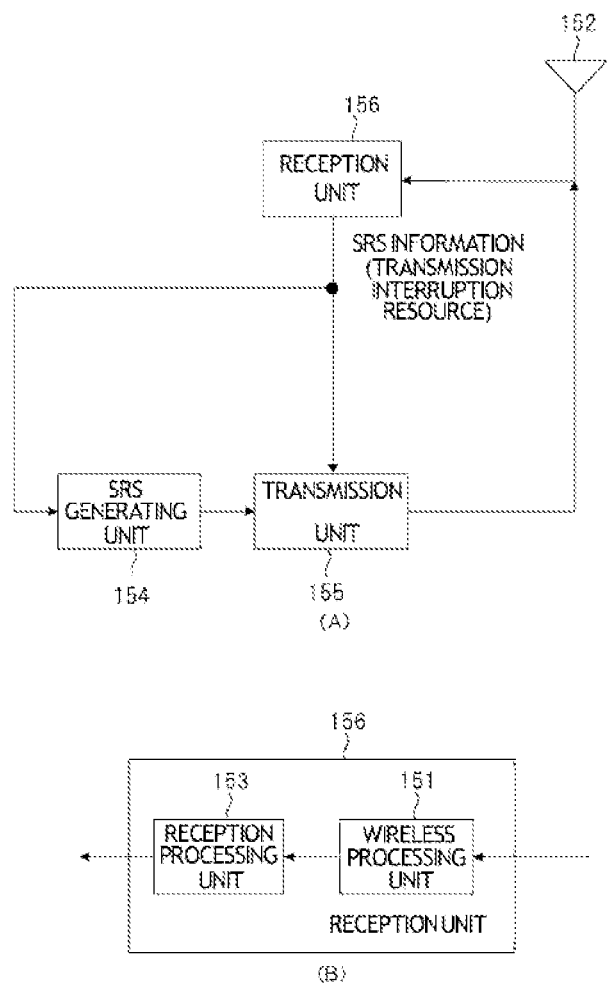
In FIG. 6, (A) and (B) are block diagrams that illustrate a main configuration of a macro terminal (transmission apparatus) according to the first embodiment.

FIG. 6 is a block diagram that illustrates a main configuration of the macro terminal (transmission apparatus) according to the first embodiment.

As illustrated in FIG. 6(A), the macro terminal that selves as a transmission apparatus in an uplink channel includes an antenna 152, a reception unit 156, an SRS generating unit 154 that corresponds to an example of the reference signal generating unit, and a transmission unit 155.

The reception unit 156 outputs the received SRS information or the SRS information (including the SRS drop resource information) that is included in the received wireless signal to the SRS generating unit 154 and the transmission unit 155. In addition, the reception unit 156, for example, as in FIG. 6(B), may further include a wireless processing unit 151 and a reception processing unit 153.

In the wireless processing unit 151, a wireless reception process may be performed as necessary for the wireless signal that is received through the antenna 152. As examples of the wireless reception process, there are down-converting, analog-to-digital (A/D) conversion, or the like of a reception signal.

The reception processing unit 153 can extract the SRS information that is included in the reception signal and output the SRS information including the SRS drop resource information to the SRS generating unit 154 and to the transmission unit 155.

The SRS generating unit 154 generates an SRS using a predetermined SRS series number (series number, CS number) based on the SRS information that is transmitted from the reception unit 156. Then, the SRS generating unit 154 generates a transmission signal by mapping the generated SRS into a predetermined uplink wireless resource (SRS transmission resource) that is a reference signal transmission resource.

Here, the SRS generating unit 154 determines whether or not the SRS transmission resource is an SRS drop resource based on the SRS information transmitted from the reception unit 156. An SRS is generated in a case where the SRS transmission resource is not an SRS drop resource, and an SRS is not generated in a case where the SRS transmission resource is an SRS drop resource.

In addition, the SRS generating unit 154 may be configured to map the generated SRS in a case where the SRS transmission resource is not an SRS drop resource and not to map the generated SRS in a case where the SRS transmission resource is an SRS drop resource.

In the transmission unit 155, a wireless transmission process may be performed for the transmission signal including the SRS transmitted from the SRS generating unit 154 in the SRS transmission subframe as is necessary. In addition, in the transmission unit 155, power amplification may be performed for the transmission signal including the SRS so as to have predetermined transmission power. As examples of the wireless transmission process, there may be up-converting, digital-to-analog (D/A) conversion, and the like of the transmission signal.

In addition, the transmission unit 155 determines whether or not the SRS transmission resource is an SRS drop resource based on the SRS information transmitted from the reception unit 156. It may be configured such that the SRS is transmitted in a case where the SRS transmission resource is not an SRS drop resource, and the SRS is not transmitted in a case where the SRS transmission resource is an SRS drop resource. In such a case, the transmission unit 155 outputs the SRS with a predetermined transmission power in the corresponding subframe in a case where the SRS is transmitted, and sets the transmission power in the corresponding subframe to zero in a case where the SRS is not transmitted.

In addition, in a case where an SRS is not generated or mapped in accordance with the SRS drop resource in the SRS generating unit 154, the transmission unit 155 directly transmits the original transmission signal with the predetermined transmission power.

<Operations of Base Station and Terminal>

Figure 7:
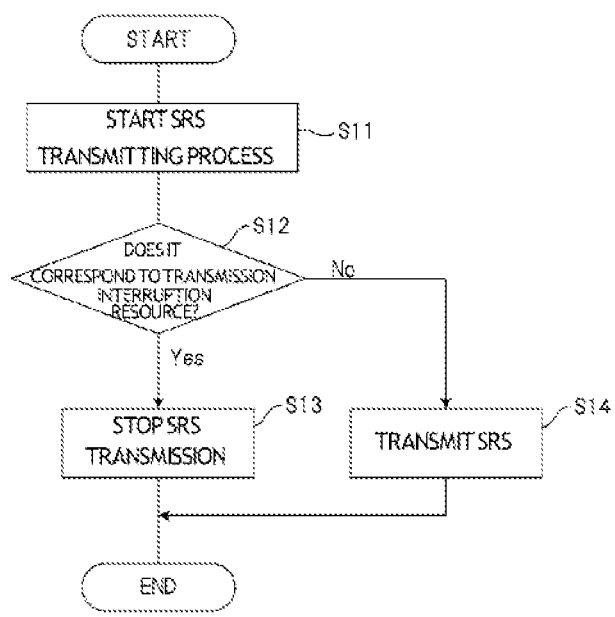
FIG. 7 is a flowchart that illustrates an SRS transmitting operation of a macro terminal according to the first embodiment.
Figure 8:
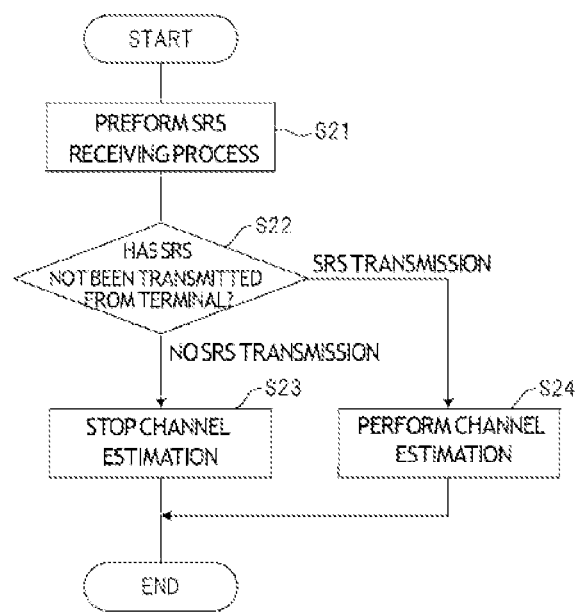
FIG. 8 is a flowchart that illustrates an SRS receiving operation of the base station of a macro cell according to the first embodiment.

Next, the operations of the base station and the terminal relating to the transmission and the reception of an SRS according to the first embodiment will be described. FIG. 7 is a flowchart that illustrates an SRS transmitting operation of the macro terminal according to the first embodiment. FIG. 8 is a flowchart that illustrates an SRS receiving operation of the base station of a macro cell according to the first embodiment.

As illustrated in FIG. 7, when the SRS transmitting process is started (Step S11), the SRS generating unit 154 determines whether or not the resource for transmitting the SRS is an SRS transmission drop resource (SRS drop resource) based on the SRS information (Step S12). Here, in a case where the above-described resource is an SRS transmission drop resource, the SRS transmission is stopped (Step S13). In a case where the SRS transmission is stopped, the generation of an SRS or the mapping of the SRS into a resource is stopped by the SRS generating unit 154, or the transmission power of the SRS is set to zero by the transmission unit 155 so as not to transmit the SRS.

On the other hand, in a case where the resource for transmitting the SRS is not an SRS transmission drop resource in Step S12, SRS transmission is performed (Step S14). In this case, the SRS generating unit 154 generates an SRS and maps the SRS into a wireless resource, and the transmission unit 155 outputs the transmission signal of the SRS with the predetermined transmission power, whereby the SRS is transmitted to the base station of the macro cell.

As illustrated in FIG. 8, the reception unit 109 performs a reception process for receiving the SRS from the macro terminal (Step S21) and determines whether the terminal (macro terminal) does not transmit the SRS due to the stopping of the SRS transmission in the macro terminal (Step S22). Here, in a case where the SRS has not been transmitted, the channel estimating unit 107 stops the channel estimation (Step S23).

In this case, the channel estimating unit 107 does not perform the channel estimating process in the corresponding resource for which the SRS is determined not to have been transmitted and outputs the content indicating that the channel estimating process is not performed to the scheduling unit 108.

Alternatively, the channel estimating unit 107 may discard the channel estimation value in the corresponding resource for which the SRS is determined not to have been transmitted and outputs the content indicating that the channel estimation value is invalidated to the scheduling unit 108.

On the other hand, in a case where the SRS is determined to have been transmitted by the terminal in Step S22, the channel estimating unit 107 performs channel estimation (Step S24). Then, the channel estimating unit 107 calculates a channel estimation value (for example, an SINR measured value) in the base station using the received SRS and outputs the channel estimation value to the scheduling unit 108.

According to the first embodiment, by using the SRS transmission drop resources, the transmission of an SRS in a resource corresponding to an SRS transmission drop resource is dropped, whereby the ICIC is performed. Accordingly, in the HetNet environment, the macro terminal that serves as an interference source in the SRS transmission drop resource does not transmit an SRS, whereby the uplink channel interference to the pico cell can be reduced. For example, as illustrated in FIGS. 4(A) and 4(B), even in a case where the frequency-domain ICIC is performed by transmitting an SRS only in a frequency band of non-continuous bands or a part of the continuous band, by using the SRS transmission drop resource, the SRS parameter can be set through signaling once.

In other words, by using the SRS transmission drop resource, the number of patterns that can be set when the resource for the SRS transmission is limited can increase, whereby the effect of the ICIC can be improved. In other words, various ICIC settings can be performed by setting the SRS transmission using a continuous band as in a conventional case by using one SRS parameter and performing notification of a band in which the SRS transmission is not performed using the SRS transmission drop resource. Therefore, according to the first embodiment, the resource for SRS transmission can be appropriately limited by the SRS transmission drop resource, and the effect of the application of the ICIC can increase.

Second Embodiment

In the second embodiment, a configuration example in which constituent elements are added to the first embodiment in a base station and in a terminal that perform the ICIC using an SRS transmission drop resource will be explained.

Figure 9:
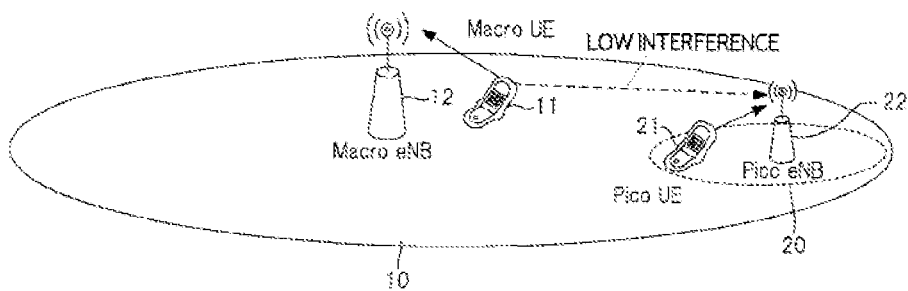
FIG. 9 is a diagram that illustrates an example of uplink channel interference of a macro terminal that is located near a cell center under the HetNet environment.

This embodiment focuses on that, under the HetNet environment, a macro terminal located near the cell center of a macro cell has a little interference with a pica cell and does not serve as an interference source. FIG. 9 is a diagram that illustrates an example of an uplink channel interference of a macro terminal that is located near a cell center under the HetNet environment. In a case where the macro terminal 11 is located in an area that is located near the cell center of the macro cell 10 (hereinafter, referred to as a cell center area), it may be assumed that a path loss between the macro terminal 11 and the base station 12 of the macro cell 10 is small. Accordingly, since the uplink transmission power of the macro terminal 11 is set in proportion to the path loss, the power decreases.

In addition, in a case where the macro terminal 11 located in the cell center area and the pico cell 20 are far away from each other, the path loss between the macro terminal 11 and the base station 22 of the pica cell 20 is large. Accordingly, the interference from an uplink transmission signal transmitted from the macro terminal 11 located in the cell center area to an uplink transmission signal of the pico terminal 21 becomes low.

Thus, in this embodiment, it is determined whether or not the terminal is a terminal that should stop the transmission of an SRS, in other words, whether the interference caused by the terminal (in the example illustrated in FIG. 9, the interference caused by the macro terminal to the pica cell) is high, and it is determined whether or not the transmission of the SRS is dropped. More specifically, by determining whether or not the path loss between the macro terminal and the base station of the macro cell is large, the interference state caused by the terminal is determined.

<Configuration and Function of Base Station>

Figure 10:
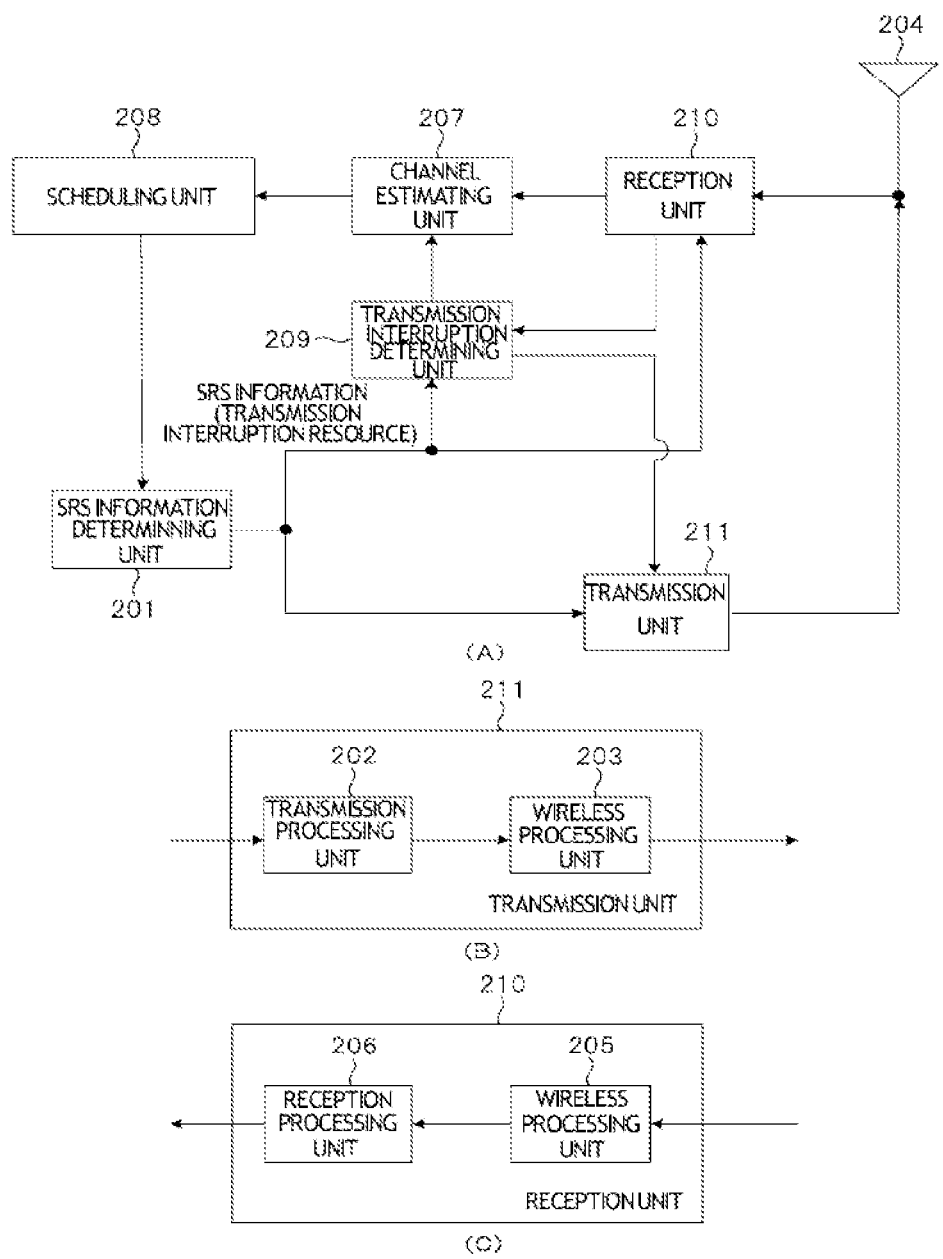
In FIG. 10, (A) to (C) are block diagrams that illustrate a main configuration of a base station (reception apparatus) of a macro cell according to a second embodiment.

FIG. 10 is a block diagram that illustrates a main configuration of the base station (reception apparatus) of the macro cell according to the second embodiment.

In FIG. 10(A), the base station of the macro cell that serves as a reception apparatus in an uplink channel includes an SRS information determining unit 201, a transmission unit 211, an antenna 204, a reception unit 210, a channel estimating unit 207, a scheduling unit 208, and a transmission drop determining unit 209 that corresponds to an example of the reference signal drop determining unit.

The SRS information determining unit 201 determines SRS information as control information relating to SRS transmission for a terminal (macro terminal) that is present in the macro cell. For example, an SRS parameter that includes an SRS transmission subframe, an SRS transmission band, an SRS transmission bandwidth, a CS amount, a transmission comb, a frequency hopping pattern, and the like is determined as the SRS information.

In addition, the SRS information determining unit 201 determines an SRS drop resource that drops SRS transmission as a part of the SRS information. The SRS drop resource includes at least one of an SRS drop band that represents a frequency band in which the SRS transmission is dropped and an SRS drop subframe that represents a subframe in which the SRS transmission is dropped. In addition, the macro terminal that drops the SRS transmission may also be set as a terminal that is located in the cell edge area.

The SRS information determining unit 201 outputs the determined SRS information including transmission drop resource information (SRS drop resource information), which is information relating to the SRS drop resource, to the transmission unit 211, the reception unit 210, and the transmission drop determining unit 209. The SRS drop resource information is unique information within a cell and may be information that is common (commonly used) to all the macro terminals within the cell. Alternatively, the SRS drop resource information may be terminal-specific information. A method of setting the SRS drop resource will be described later.

The SRS information that is generated by the SRS information determining unit 201 is transmitted to the terminal, as control information of an RRC layer in the case of the terminal-specific information or as system control information in the case of cell-specific information (common to all the terminals).

The transmission unit 211 transmits the SRS information received from the SRS information determining unit 201, or a transmission signal including the SRS information. In addition, the transmission unit 211, for example, as illustrated in FIG. 10B, may include a transmission processing unit 202 and a wireless processing unit 203.

The transmission processing unit 202 can generate a transmission signal by mapping the SRS information transmitted from the SRS information determining unit 201 into a predetermined downlink wireless resource. In addition, before mapping, the SRS information may be encoded and/or modulated.

In addition, in a case where the transmission signal is an OFDM signal, the transmission processing unit 202 forms an OFDM signal by mapping a modulated signal into a predetermined downlink wireless resource, converting it into a time waveform by performing inverse fast Fourier transform (IFFT), and adding a CP (Cyclic Prefix) thereto and outputs the OFDM signal to the wireless processing unit 203.

The wireless processing unit 203 performs a wireless transmission process for the transmission signal as is necessary and performs power amplification of the transmission signal so as to have predetermined transmission power. Then, the wireless processing unit 203 transmits the transmission signal through the antenna 204. As examples of the wireless transmission process, there may be up-converting, digital-to-analog (D/A) conversion, and the like of the transmission signal.

The reception unit 210 outputs an SRS that is included in the received wireless signal to the channel estimating unit 207. In addition, the reception unit 210, for example, as in FIG. 10(C), includes a wireless processing unit 205 and a reception processing unit 206.

In the wireless processing unit 205, a wireless reception process may be performed as necessary for the wireless signal that is received through the antenna 204. As examples of the wireless reception process, there may be down-converting, analog-to-digital (A/D) conversion, or the like of a reception signal.

In the reception processing unit 206, an SRS transmitted from a terminal, which has been received by the base station, may be extracted based on the SRS information transmitted from the SRS information determining unit 201.

The transmission drop determining unit 209 determines whether or not the macro terminal (hereinafter, simply referred to as a terminal) has dropped the SRS transmission, in other words, whether SRS drop is applied in the macro terminal and outputs the determination result to the channel estimating unit 207. This determination of the application of the SRS drop is performed based on the SRS information that is generated by the SRS information determining unit 201 or based on characteristic information of a reception signal from the macro terminal that is received from the reception unit 210.

For example, an SRS transmission subframe, an SRS transmission band, an SRS transmission bandwidth, and the like are used as SRS information, and the above-described determination is performed based on a result of magnitude comparison between the SRS transmission bandwidth of the macro terminal and a predetermined threshold value and the like. As the characteristic information of the reception signal, a path loss level that is periodically reported from the terminal to the base station, a power headroom (the headroom of the transmission power of a terminal), and a reception level of the downlink reference signal, and the like are used.

In this embodiment, an example is illustrated in which an SRS drop performing determination of whether SRS drop is performed in a macro terminal is performed by the macro terminal itself. The determination methods of the SRS drop applying determination and the SRS drop performing determination will be described later.

In addition, the SRS drop performing determination may be independently performed by the base station side. In a case where the SRS drop performing determination is performed at the base station side, the transmission drop determining unit 209 generates SRS drop information used for dropping an SRS transmission in the terminal as the transmission drop information and outputs the SRS drop information to the transmission unit 211. The transmission unit 211 transmits the SRS drop information or a transmission signal including the SRS drop information.

In addition, for example, as illustrated in FIG. 10(B), in a case where the transmission unit 211 includes the transmission processing unit 202, the transmission processing unit 202 performs a process of mapping the SRS drop information, similarly to the above-described SRS information, into the downlink wireless resource and outputs the result to the wireless processing unit 203.

The channel estimating unit 207 calculates a channel estimation value (SINR measured value) in the base station by performing a correlation operation on the SRS, which is transmitted from the reception unit 210, with a replica signal and outputs the channel estimation value to the scheduling unit 208.

At this time, the channel estimating unit 207 determines whether the terminal has dropped the SRS transmission based on a determination result transmitted from the transmission drop determining unit 209. In a case where it is determined that the terminal has dropped the SRS transmission, the channel estimating unit 207 discards the channel estimation value of the SRS drop resource. Then, the channel estimating unit 207 outputs a content indicating that the channel estimation value in the resource is invalidated to the scheduling unit 208.

Alternatively, in a case where it is determined that the terminal has dropped the SRS transmission, the channel estimating unit 207 does not perform channel estimation in the SRS drop resource. Then, the channel estimating unit 207 outputs a content indicating that channel estimation has not been performed in the corresponding resource to the scheduling unit 208.

The scheduling unit 208 performs scheduling of terminals present within the cell based on the channel estimation value that is derived from the received SRS. As examples of the scheduling, there may be assignment of resources to data or the SRS, a modulation scheme and/or control of an encoding ratio, and the like. The scheduling unit 208 outputs the scheduled information to the SRS information determining unit 201.

The base station of the macro cell comprising the transmission drop determining unit 209 has been explained above. However, the present embodiment can also be realized by the base station of the macro cell as shown in FIG. 5 without the transmission drop determining unit 209.

At this time, The determination by the transmission drop determining unit 209 in FIG. 10 on whether or not the SRS transmission is dropped by the macro terminal (i.e., the determination of whether the SRS drop is applied in the macro terminal) is performed by the channel estimating unit 107 of FIG. 5.

In particular, the determination of whether or not the SRS drop is applied by the channel estimating unit 107 is performed based on the SRS information generated by the SRS information determining unit 201, or the characterizing information of the reception signal received by the reception unit from the macro terminal. For example, the SRS transmission subframe, the SRS transmission frequency band, the SRS transmission bandwidth, etc. are used as the SRS information, and it is determined by comparing the SRS transmission bandwidth of the macro terminal and the threshold. As the characterizing information of the reception signal, the path loss level that is reported periodically to the base station from the terminal, the power headroom and the reception level of the downlink reference signal, etc. is used. The determination methods of the SRS drop applying determination and the SRS drop performing determination will be described later.

The channel estimating unit 107 discards the channel estimation value of the SRS drop resource when it is determined that the terminal has dropped the SRS transmission. Then, the channel estimating unit 107 outputs a content indicating that the channel estimation Value of the resource is invalidated to the scheduling unit 108.

Alternatively, the channel estimating unit 107 does not perform channel estimation in the SRS drop resource when it is determined that the terminal has dropped the SRS transmission and outputs a content indicating that the channel estimation is not performed in the resource to the scheduling unit 108.

However, the SRS drop performing determination may be performed at the base station independently. When the SRS drop performing determination is performed at the base station side, the channel estimating unit 107 generates the SRS drop information for dropping the SRS transmission in the terminal as the transmission drop information, and outputs it to the transmission unit 110. The transmission unit 110 transmits the SRS drop information or the transmission signal including the SRS drop information.

<Configuration and Function of Terminal>

Figure 11:
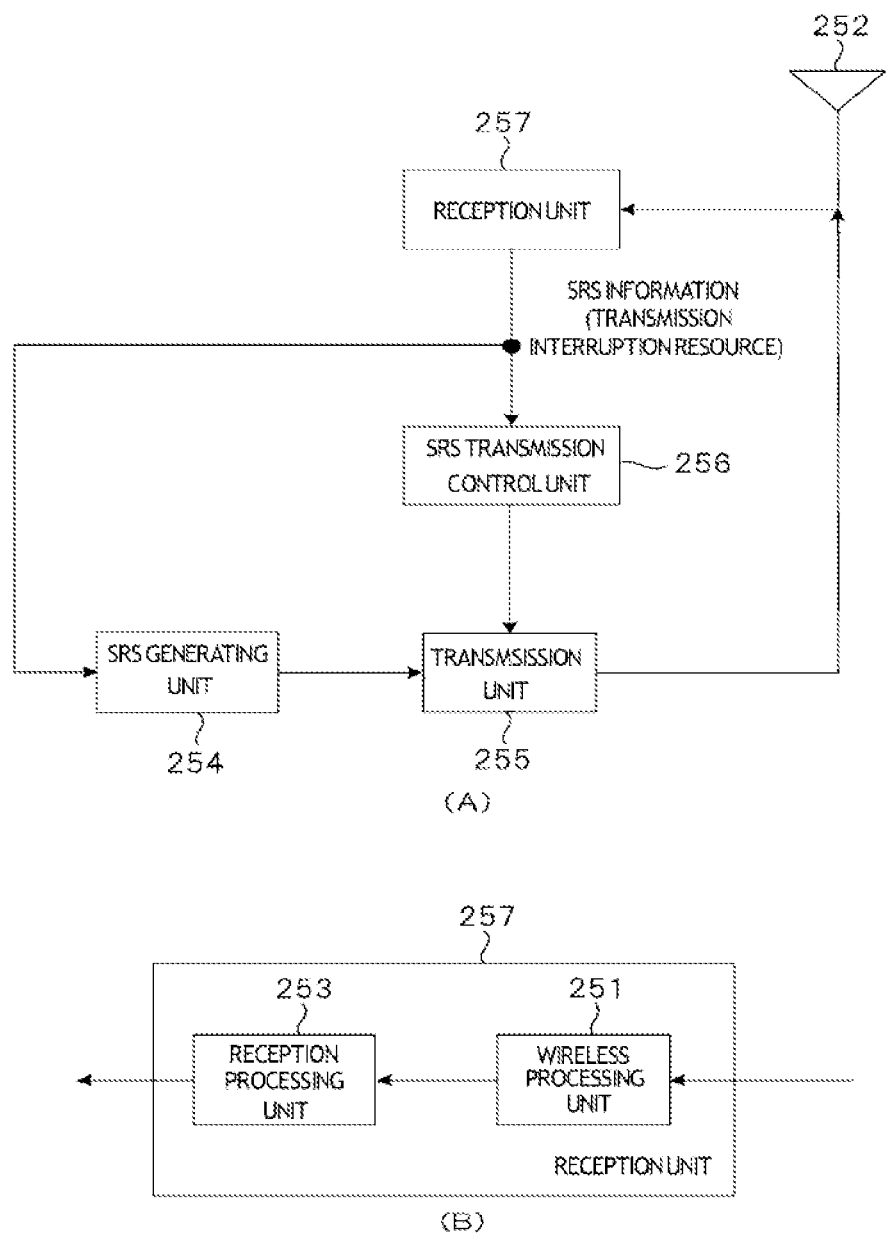
In FIG. 11, (A) and (B) are block diagrams that illustrate a main configuration of a macro terminal (transmission apparatus) according to the second embodiment.

FIG. 11 is a block diagram that illustrates a main configuration of the macro terminal (transmission apparatus) according to the second embodiment.

As illustrated in FIG. 11(A), the macro terminal that serves as a transmission apparatus in an uplink channel includes an antenna 252, a reception unit 257, an SRS generating unit 254, a transmission unit 255, and an SRS transmission control unit 256 that corresponds to an example of the reference signal transmission control unit.

The reception unit 257 outputs the received SRS information or the SRS information (including the SRS drop resource information) that is included in the received wireless signal to the SRS generating unit 254 and the SRS transmission control unit 256. In addition, the reception unit 257, for example, as in FIG. 11(B), may also include a wireless processing unit 251 and a reception processing unit 253.

The wireless processing unit 251 may perform a wireless reception process as necessary for the wireless signal that is received through the antenna 252. As examples of the wireless reception process, there may be down-converting, analog-to-digital (A/D) conversion, or the like of a reception signal.

The reception processing unit 253 can extract the SRS information that is included in the reception signal and output the SRS information in which the SRS drop resource information is included to the SRS generating unit 254 and the SRS transmission control unit 256.

The SRS transmission control unit 256 determines whether or not the SRS transmission resource (the SRS transmission band and the SRS transmission subframe) of the macro terminal coincides with the SRS drop resource and whether the macro terminal itself performs SRS drop. The SRS drop performing determination is performed similarly to the SRS drop applying determination performed by the transmission drop determining unit 209 of the base station.

In other words, the SRS transmission control unit 256 performs the SRS drop performing determination based on the SRS information transmitted from the reception unit 257 or the characteristic information of the reception signal transmitted from the base station that is input from the reception unit 257. The method of the SRS drop performing determination will be described later.

For example, the SRS transmission control unit 256 performs the SRS drop performing determination based on a result of the magnitude comparison between the SRS transmission bandwidth of the terminal and a predetermined threshold value by using the SRS transmission subframe, the SRS transmission band, the SRS transmission bandwidth, and the like as the SRS information and the like. As the characteristic information of the reception signal, a path loss level between the terminal and the base station, a power headroom (a headroom of the transmission power of the terminal), the reception level of the downlink reference signal, and the like are used.

In a case where the SRS transmission resource of the macro terminal coincides with the SRS drop resource, and the above-described terminal is a terminal that applies high interference to the other cell (a terminal in which the path loss between the terminal and the base station is large), the SRS transmission control unit 256 determines the performing of the SRS drop (the application of the SRS drop in the terminal). Then, the SRS transmission control unit 256 outputs an instruction for dropping the SRS transmission to the transmission unit 255. On the other hand, in a case where the SRS drop is not performed, the SRS transmission control unit 256 outputs an instruction for transmitting an SRS as in a normal case to the transmission unit 255.

The SRS generating unit 254 generates an SRS using a predetermined SRS series number (a series number and a CS number) based on the SRS information transmitted from the reception unit 257. Then, the SRS generating unit 254 generates a transmission signal by mapping the generated SRS into a predetermined uplink wireless resource (SRS transmission resource).

In addition, in a case where the transmission signal is transmitted as an OFDM signal, the SRS generating unit 254 performs an IFFT process for an SRS transmission signal together with other data signals not shown in the drawing, adds a CP, and outputs the signal after the addition of the CP to the transmission unit 255.

Furthermore, based on the instruction indicating whether or not the SRS drop is performed, which is transmitted from the SRS transmission control unit 256, the SRS generating unit 254 may generate an SRS in a case where the SRS is not dropped and not generate an SRS in a case where the SRS is dropped.

Alternatively, based on the instruction indicating whether or not the SRS drop is performed, the SRS generating unit 254 may also map the generated SRS into the SRS transmission resource in a case where the SRS is not dropped and not map the generated SRS into the SRS transmission resource in a case where the SRS is dropped.

The transmission unit 255 may perform a wireless transmission process for the transmission signal including the SRS transmitted from the SRS generating unit 254 in the SRS transmission subframe as is necessary. In addition, the transmission unit 255 performs power amplification for the transmission signal including the SRS so as to have predetermined transmission power. As examples of the wireless transmission process, there may be up-converting, digital-to-analog (D/A) conversion, and the like of the transmission signal.

In addition, the transmission unit 255 may transmit the SRS in a case where the SRS is not dropped and not transmit the SRS in a case where the SRS is dropped, based on the instruction indicating whether the SRS drop is performed, which is transmitted from the SRS transmission control unit 256. In such a case, the transmission unit 255 outputs the SRS with a predetermined transmission power in the corresponding subframe in a case where the SRS is transmitted, and sets the transmission power in the corresponding subframe to zero in a case where the SRS is not transmitted.

In addition, in a case where an SRS is not generated or mapped in accordance with the SRS drop resource by the SRS generating unit 254, the transmission unit 255 only needs to directly transmit the original transmission signal with the predetermined transmission power.

The terminal of the macro cell comprising the SRS transmission control unit 256 has been explained above. However, the present embodiment can also be realized by the terminal of the macro cell as shown in FIG. 6 without the SRS transmission control unit 256.

At this time, the determination of whether or not the SRS transmission resource (the SRS transmission frequency band, the SRS transmission subframe) coincides with the SRS drop resource and the determination of whether or not the macro terminal performs the SRS drop by the SRS transmission control unit 256 in FIG. 11(A) is performed by the transmission unit 155 of FIG. 6. The SRS drop performing determination is performed in a similar way to the SRS drop applying determination by the transmission drop determining unit 209 (or the channel estimation unit 107) of the base station.

That is, the transmission runt 155 performs the SRS drop performing determination based on the SRS information from the reception unit 156, or based on the characterizing information of the reception signal inputted from the reception unit 156. The determining method of the SRS drop performing determination will be described later.

For example, the transmission unit 155 uses the SRS transmission subframe, the SRS transmission frequency band, the SRS transmission bandwidth, etc. as the SRS information, and performs determination by comparing the SRS transmission bandwidth of the terminal and a threshold value. As the characterizing information of the reception signal, the path loss level between the terminal and the base station, the power headroom (the headroom of the transmission power of the terminal) and the reception level of the downlink reference signal, etc. is used.

The transmission unit 155 decides to perform the SRS drop (the application of SRS drop in the terminal) when it is determined that the SRS transmission resource of the macro terminal coincides with the SRS drop resource and the terminal is a terminal that applies high interference to other cells by the macro terminal itself (the path loss between the terminal and the base station is large). Then, the transmission unit 155 drops the SRS transmission. On the other hand, the transmission unit 155 transmits the SRS as in the normal case when the SRS transmission drop is not performed. The transmission unit 155 output a content indicating whether the SRS drop can be performed to the SRS generating unit 154.

The SRS generating unit 154 may also generate the SRS when the SRS transmission is not dropped, and not generate the SRS when the SRS transmission is dropped, based on the instruction on whether the SRS drop can be performed from the transmission unit 155.

Alternatively, the SRS generating unit 154 may map the generated SRS into the SRS transmission resource when the SRS transmission is not dropped, and not map the generated SRS into the SRS transmission resource when the SRS transmission is dropped, based on the instruction on whether the SRS drop can be performed.

In addition, the SRS generating unit 154 outputs in the subframe with a predetermined transmission power when the SRS is transmitted (the SRS drop is not performed), and sets the transmission power to zero when the SRS is not transmitted (the SRS drop is performed).

The transmission unit 155 only needs to transmit the transmission signal with the predetermined transmission power directly, when the SRS is not generated or not mapped based on the SRS drop resource in the SRS generating unit 154.

<Method of Determining SRS Drop>

Here, the method of determining the SRS drop relating to the SRS drop applying determination that is performed by the transmission drop determining unit 209 (or the channel estimating unit 107) of the base station and the SRS drop performing determination that is performed by the SRS transmission control unit 256 (or the transmission unit 155) of the terminal will be described.

In this embodiment, the determination of whether the SRS drop is applied to the terminal or the determination of whether the SRS drop is performed in the terminal is performed based on a determination of whether or not interference caused by the terminal to other cells is in a large state in addition to the determination of whether the SRS transmission resource is the SRS drop resource.

As the state in which the interference caused by the terminal is large, there may be a case where a path loss level between the terminal and the base station is large, a case where a power headroom of the terminal is small, a case where the reception level of the downlink reference signal is low, or a case where the terminal is the cell edge terminal that is located in the cell edge area, and the like. As above, in a case where the SRS transmission resource is an SRS drop resource set in advance, and the interference caused by the terminal to other cells located on the periphery thereof is high, by dropping the SRS transmission, the uplink channel interference can be reduced.

At this time, in order to perform the SRS drop determination, the terminal determines whether the macro terminal is a terminal (for example, a cell edge terminal) applying high interference to a pico cell located on the periphery or the macro terminal is a terminal (for example, a cell center terminal) that does not apply high interference by using a determination criterion that is set in advance between the terminal and the base station. By determining the determination criterion in advance, the base station can correctly determine whether or not the macro terminal drops the SRS in the SRS drop resource.

As the determination criterion of the SRS drop, the terminal, for example, uses the path loss level that increases as a distance between the base station and the terminal becomes long, a power headroom that decreases as the distance becomes long, or the reception level of the downlink reference signal. More specifically in a case where the path loss level (a value that is periodically reported to the base station by the terminal) measured by the terminal exceeds a threshold value (or above the threshold value), the terminal is determined as a terminal that applies high interference to a pico cell located on the periphery.

In addition, in a case where the power headroom or the reception level (a value that is periodically reported to the base station by the terminal) of the downlink reference signal, which is measured by the terminal, is smaller than the threshold value (or below the threshold value), the terminal is determined as a terminal that applies high interference to a pico cell located on the periphery. For a terminal that is located in the cell edge area, a terminal of which the path loss level is above the threshold value, or a terminal of which the power headroom or the reception level of the downlink reference signal is below the threshold value, the uplink transmission power is high, and accordingly, by applying the SRS drop, the uplink channel interference to the pico cell can be suppressed.

In addition, as the determination criterion of the SRS drop, the terminal, for example, may use the SRS transmission bandwidth (a value that is reported to the terminal by the base station in advance) of the terminal. Since there is a limitation of the maximum transmission power for the cell edge terminal, the transmission bandwidth of the SRS cannot be set large. In other words, in order to assure a power transmission density that is necessary for preventing the deterioration of the channel estimation precision, a transmission bandwidth of a small value is set in the cell edge terminal. Accordingly, in a case where the SRS transmission bandwidth of the terminal is smaller than a threshold value, the terminal is determined as a cell edge terminal that applies high interference to a pico cell located on the periphery.

Here, the threshold value that is used for the above-described determination may be derived from the bandwidth (hereinafter, referred to as an SRS drop bandwidth) of the SRS drop resource that is reported to the terminal in advance. For example, as described above, since the SRS transmission bandwidth of the cell edge terminal is small, in a case where "(SRS transmission bandwidth)≤(a total value of SRS drop bandwidths)" is satisfied, the terminal is determined as a cell edge terminal. Alternatively, in a case where "(SRS transmission bandwidth)≤(one SRS drop bandwidth)" is satisfied, the terminal may be determined as a cell edge terminal.

By using the SRS transmission bandwidth or the SRS drop bandwidth as the determination criterion, the SRS drop can be determined by using the information of the SRS transmission bandwidth or the SRS drop bandwidth, which has been notified, there is an advantage that new additional signaling for the determination is not necessary. In addition, since the terminal determines whether or not the SRS is applied based on the SRS transmission bandwidth of an existing terminal, the base station can accurately determine whether or not the terminal drops the SRS. Furthermore, by deriving the threshold value used for the determination from the SRS drop band, which has been notified, the signaling for the determination can be reduced.

<Application Example of SRS Drop>

Here, an operation example in a case where the frequency-domain ICIC is performed using the SRS drop resource will be described as an application example of the SRS drop according to the second embodiment.

Figure 12:
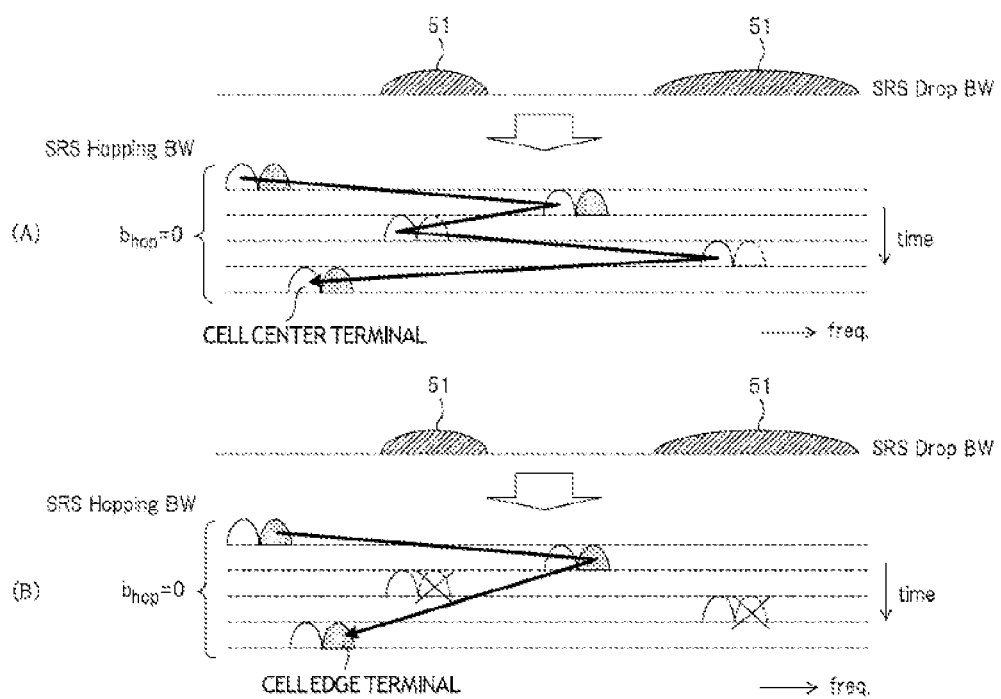
In FIG. 12, (A) and (B) are diagrams that illustrate application examples of a drop of SRS transmission in the frequency domain according to the second embodiment.

FIG. 12 is a diagram that illustrates an application example of the frequency-domain SRS drop according to the second embodiment. The example illustrated in FIG. 12 is a case where an SRS drop band (also referred to as an SRS transmission drop band; SRS Drop BW) 51 that is set in advance is used in the frequency hopping of the SRS illustrated in FIG. 1. In the example illustrated in FIG. 12, while frequency hopping is performed as $b_{hop}=0$ and b=3. SRS drop bands 51 of two non-continuous bands are set, and an SRS is transmitted in a non-continuous band that is not the SRS drop band 51.

In a case where the SRS transmission band is the SRS drop band 51, the terminal determines whether or not the interference caused by the terminal is large and stops the SRS transmission in a case where the interference is high. Here, as an example, in a case where the SRS transmission bandwidth is set to the same bandwidth in the cell center terminal and the cell edge terminal, it is determined whether the SRS drop is performed based on whether the terminal is the cell edge terminal or the cell center terminal.

As illustrated in FIG. 12, in the case of the cell center terminal (SRS transmission in a white narrow band), the terminal does not drop the SRS transmission even for the SRS drop band 51 and performs SRS transmission in a normal hopping pattern according to the SRS parameter set in advance. On the other hand, in the case of the cell edge terminal (SRS transmission in a narrow band denoted by dots), the terminal, as represented by "x" in the drawing, drops the SRS transmission in the SRS drop band 51 and performs SRS transmission only in a frequency band except for the SRS drop band 51.

Figure 13:
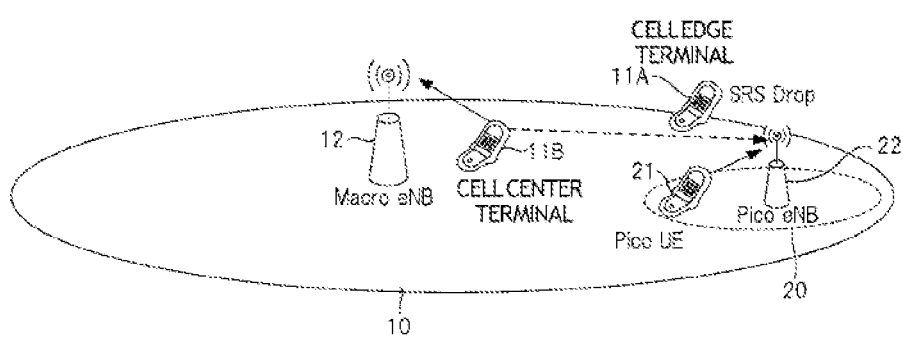
FIG. 13 is a diagram that illustrates an application example of a drop of SRS transmission under the HetNet environment.

FIG. 13 is a diagram that illustrates an application example of the SRS drop under the HetNet environment and illustrates a case where the SRS drop is applied to a cell edge terminal. In a case where the macro terminal is the cell edge terminal 11A, by applying the SRS drop in the SRS drop resource, the SRS transmission resource is limited, and the uplink channel interference with the pico cell 20 can be reduced. In addition, in a case where the macro terminal is the cell center terminal 11B, since the uplink channel interference with the pico cell 20 is low, the SRS drop is not applied in the SRS drop resource, and a high throughput of the macro cell 10 can be acquired.

As above, by dropping the SRS using the macro terminal in the SRS drop band set in advance, the interference to the pico cell can be reduced. In addition, in the SRS drop band set in advance, whether the SRS drop is applied is determined for each terminal, and a macro terminal that causes high interference and is determined to apply the SRS drop drops the SRS. On the other hand, a macro terminal that causes low interference and is determined not to apply the SRS drop transmits an SRS. Accordingly, a decrease in the throughput in the macro cell can be prevented while the interference to the pico cell is reduced.

<Notification Method of SRS Drop Band>

In a case where the frequency-domain ICIC is performed, a method of performing a notification of the SRS drop band, which is performed by the SRS information determining unit

Figure 14:
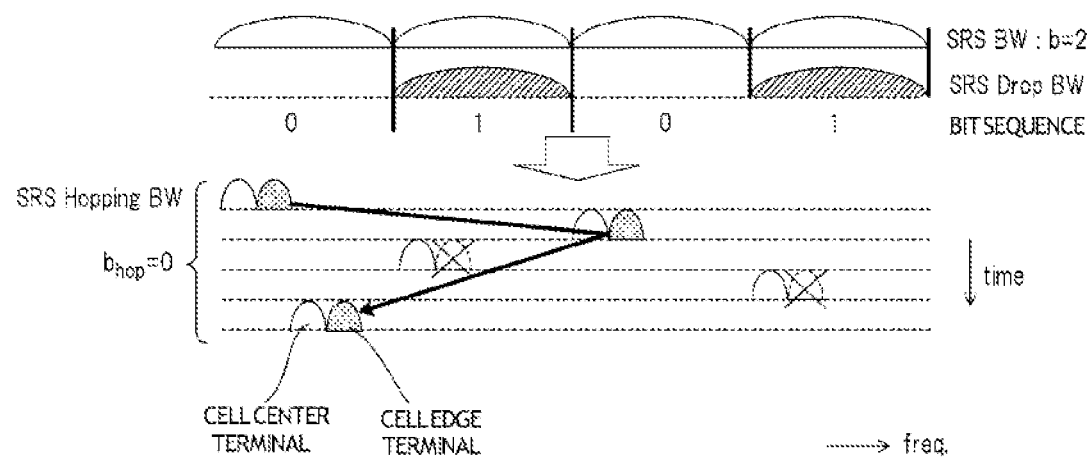
FIG. 14 is a diagram that illustrates an example of a notification method of an SRS drop band.

201 of the base station, will be described. FIG. 14 is a diagram that illustrates an example of the notification method of an SRS drop band.

The SRS drop band can be represented as a bit sequence that represents the position of the SRS transmission band that can be used by the terminal. For example, by representing whether or not each SRS transmission band is set as an SRS drop band using a bit having a value 0 or 1 in correspondence with the SRS transmission bands respectively (four SRS BW:b=0 to 3), the notification of the SRS drop band can be performed. In the example illustrated in FIG. 14, the SRS drop band is reported in a bit map format in units of the allocation of the SRS transmission band for which SRS BW:b=2. In other words, regarding the SRS drop band, whether the four SRS transmission bands are SRS drop bands are reported by a bit sequence such as 0, 1, 0, 1, respectively.

Conventionally, in order to perform frequency hopping of the SRS in non-continuous bands, the SRS parameter is changed, and accordingly, signaling of 24 bits is necessary for each terminal every time. In contrast to this, in the case of the notification method illustrated in FIG. 14, the information representing the SRS drop band is acquired by adding only four bits to the SRS parameter, whereby the amount of signaling can be reduced. In addition, by setting the information representing the SRS drop band as cell-specific information (common to all the terminals), the amount of signaling can be further reduced, whereby a decrease in the throughput can be prevented.

In addition, as the SRS transmission bandwidth, a predetermined fixed width or a variable width of an appropriate value is set based on the environments such as the system bandwidth of each cell, the number of connected terminals, and the like. In a case where the system bandwidth is large, a large SRS transmission bandwidth can be set, while in a case where the system bandwidth is small, a small SRS transmission bandwidth can be set. Accordingly, the SRS drop bandwidth can be set for each cell by applying the setting using the SRS transmission bandwidth, in other words, a length of the bit sequence that changes in accordance with the SRS transmission bandwidth can be set. Here, in a case where the system bandwidth is a broad bandwidth, the SRS transmission bandwidth is larger, and the length of the bit sequence is suppressed, and the amount of signaling used for notifying the SRS drop band can be further decreased.

As above, by notifying the SRS drop band as the bit sequence, the transmission drop resource can be reported in a small amount of signaling, and an increase in the overhead can be suppressed. In addition, an SRS drop band that is appropriate to each cell can be easily set.

<Operations of Base Station and Terminal>

Figure 15:
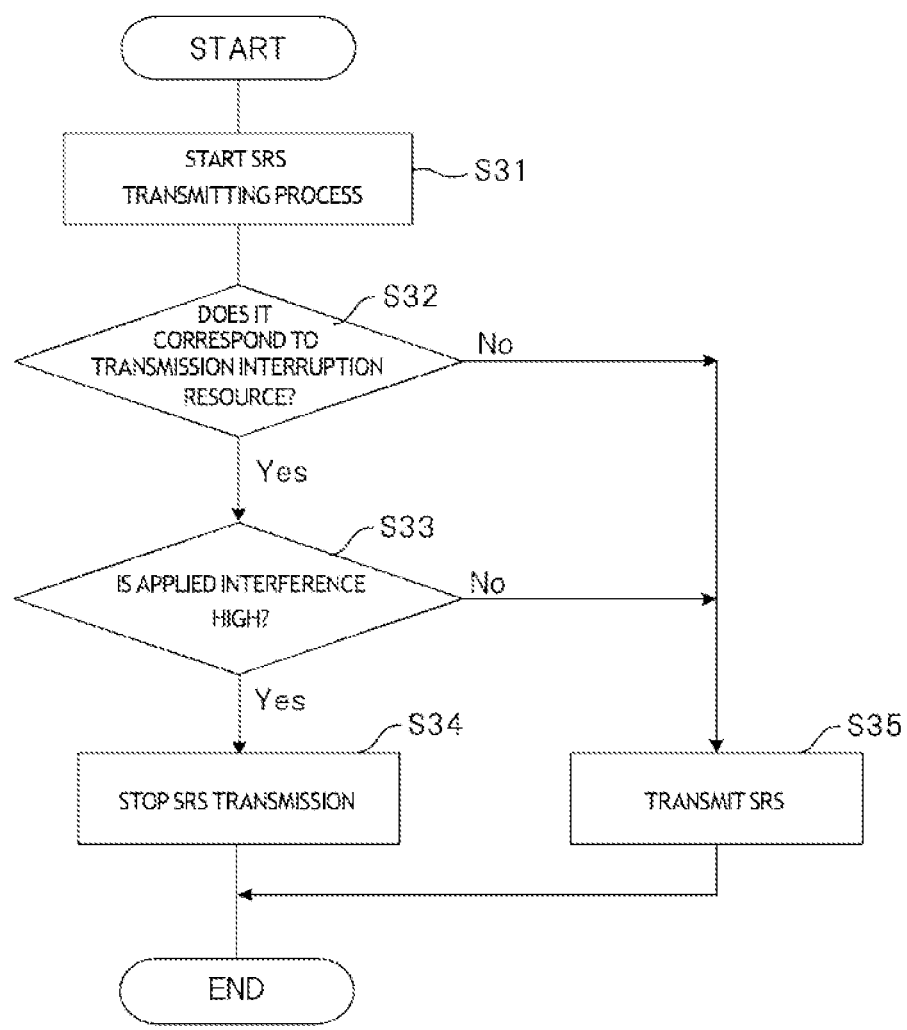
FIG. 15 is a flowchart that illustrates an SRS transmitting operation of the macro terminal according to the second embodiment.
Figure 16:
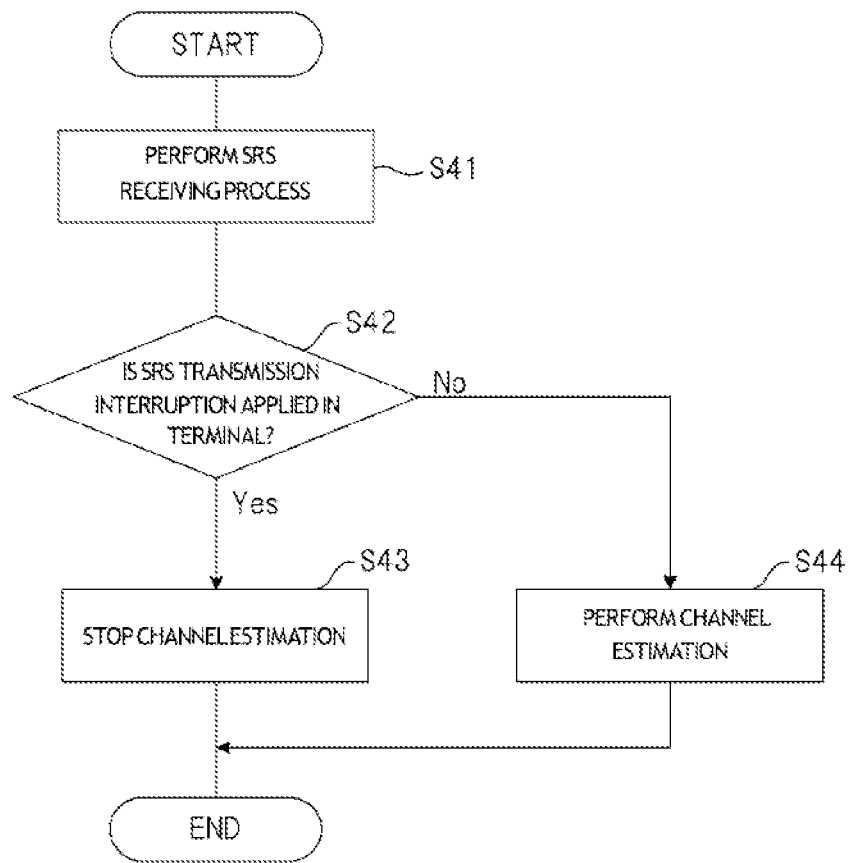
FIG. 16 is a flowchart that illustrates an SRS receiving operation of the base station of the macro cell according to the second embodiment.

Next, the operations of the base station and the terminal relating to the transmission and the reception of an SRS according to the second embodiment will be described. FIG. 15 is a flowchart that illustrates an SRS transmitting operation of the macro terminal according to the second embodiment. FIG. 16 is a flowchart that illustrates an SRS receiving operation of the base station of the macro cell according to the second embodiment.

In the case of FIG. 11, in FIG. 15, when the SRS transmitting process is started (Step S31), the SRS transmission control unit 256 determines whether or not the resource for transmitting the SRS is an SRS transmission drop resource (SRS drop resource) based on the SRS information (Step S32).

Here, in a case where the above-described resource is an SRS transmission drop resource, the SRS transmission control unit 256 determines whether or not the interference caused by the macro terminal to other cells is large (Step S33).

In a case where the interference is determined to be high as in a case where the path loss level between the terminal and the base station is large or the like, the SRS transmission control unit 256 instructs the transmission unit 255 to stop the SRS transmission, and the SRS transmission is stopped (Step S34). In a case where the SRS transmission is stopped, the transmission power of the SRS is set to zero by the transmission unit 255 so as not to transmit the SRS.

In addition, the SRS generating unit 254 may stop the SRS transmission by stopping the generation of an SRS or stopping mapping the SRS into an SRS resource based on an instruction transmitted from the SRS transmission control unit 256.

On the other hand, in a case where the resource for transmitting the SRS is not an SRS drop resource in Step S32 and in a case where the interference caused by the macro terminal to other cells is not high in Step S33, the SRS transmission is performed (Step S35). In this case, based on an instruction transmitted from the SRS transmission control unit 256, the SRS generating unit 254 generates an SRS and maps of the SRS into the uplink wireless resource, and the transmission unit 255 outputs a transmission signal of the SRS with the predetermined transmission power, whereby the SRS is transmitted to the base station of the macro cell.

In the case of FIG. 6, in FIG. 15, when the SRS transmitting process is started (Step S31), the transmission unit 155 determines whether or not the resource for transmitting the SRS is an SRS transmission drop resource (SRS drop resource) based on the SRS information (Step S32).

Here, in a case where the above-described resource is an SRS transmission drop resource, the transmission unit 155 determines whether or not the interference caused by the macro terminal to other cells is large (Step S33). In a case where the interference is determined to be high as in a case where the path loss level between the terminal and the base station is large or the like, the SRS transmission is stopped (Step S34). In a case where the SRS transmission is stopped, the transmission power of the SRS is set to zero by the transmission unit 155 so as not to transmit the SRS.

In addition, the SRS generating unit 154 may stop the SRS transmission by stopping the generation of an SRS or stopping mapping the SRS into an SRS resource based on an instruction transmitted from the transmission unit 155.

On the other hand, in a case where the resource for transmitting the SRS is not an SRS drop resource in Step S32 and in a case where the interference caused by the macro terminal to other cells is not high in Step S33, the SRS transmission is performed (Step S35). In this case, based on an instruction transmitted from the transmission unit 155, the SRS generating unit 154 generates an SRS and performs mapping of the SRS into the uplink wireless resource, and the transmission unit 155 outputs a transmission signal of the SRS with the predetermined transmission power, whereby the SRS is transmitted to the base station of the macro cell.

In the case of FIG. 10, in FIG. 16, the reception unit 210 performs a reception process for receiving the SRS from the macro terminal (in Step S41). Then, the transmission drop determining unit 209 determines whether or not the SRS transmission drop is applied to the terminal (macro terminal), and whether or not the SRS has been transmitted, based on the SRS information or the characteristic information of the reception signal (Step S42).

Here, in a case where the SRS transmission drop is determined to have been applied in the terminal, the transmission drop determining unit 209 instructs the channel estimating unit 207 to stop the channel estimation, and the channel estimating unit 207 stops the channel estimation (Step S43).

Then, the channel estimating unit 207 does not perform a channel estimating process in the corresponding resource to which the SRS transmission drop is determined to be applied and outputs the content indicating that the channel estimating process is not performed to the scheduling unit 208. Alternatively, the channel estimating unit 207 discards the channel estimation value in the corresponding resource to which the SRS transmission drop is determined to be applied, and outputs the content indicating that the channel estimation value is invalidated to the scheduling unit 208.

On the other hand, in a case where the SRS transmission drop is determined to not have been applied to the terminal and the SRS is determined to have been transmitted in Step S42, the channel estimating unit 207 performs channel estimation (Step S44). Then, the channel estimating unit 207 calculates a channel estimation value (for example, an SINR measured value) in the base station by using the received SRS and outputs the calculated channel estimation value to the scheduling unit 208.

In the case of FIG. 5, in FIG. 16, the reception unit 109 performs a reception process for receiving the SRS from the macro terminal (in Step S41). Then, the channel estimating unit 107 determines whether or not the SRS transmission drop is applied to the terminal (macro terminal), and whether or not the SRS has been transmitted, based on the SRS information or the characteristic information of the reception signal (Step S42).

Here, in a case where the SRS transmission drop is determined to have been applied in the terminal, the channel estimating unit 107 stops the channel estimation (Step S43). Then, the channel estimating unit 107 does not perform a channel estimating process in the corresponding resource to which the SRS transmission drop is determined to be applied and outputs the content indicating that the channel estimating process is not performed to the scheduling unit 108. Alternatively the channel estimating unit 107 discards the channel estimation value in the corresponding resource to which the SRS transmission drop is determined to be applied, and outputs the content indicating that the channel estimation value is invalidated to the scheduling unit 108.

On the other hand, in a case where the SRS transmission drop is determined to not have been applied to the terminal and the SRS is determined to have been transmitted in Step S42, the channel estimating unit 107 performs channel estimation (Step S44). Then, the channel estimating unit 107 calculates a channel estimation value (for example, an SINR measured value) in the base station by using the received SRS and outputs the calculated channel estimation value to the scheduling unit 108.

According to the second embodiment, in the SRS drop resource, a macro terminal that is determined to be an interference source based on a determination result such as being located in the cell edge area does not transmit an SRS, and accordingly, the uplink channel interference to the pico cell located on the periphery can be reduced. In addition, by setting the SRS drop band as non-continuous bands or a continuous band, the SRS transmission band can be set as a non-continuous band, whereby the frequency hopping of the SRS can be performed in non-continuous bands through a small amount of signaling.

By configuring the SRS drop resource information as cell-specific information (common to all the terminals), compared to a case where the SRS drop resource information is transmitted to all the terminals, the amount of signaling of the downlink channel can be further decreased. Alternatively, by configuring the SRS drop resource information to be terminal-specific information, an SRS drop resource that is optimal to each terminal can be set, whereby the effect of the improvement of the system performance can be further improved through the ICIC.

In addition, the macro terminal that does not serve as an interference source for the pico cell located on the periphery that is determined based on the determination result such as being located in the cell center area transmits an SRS as is usual also in the SRS drop resource, the deterioration of the throughput of the macro cell can be prevented.

Furthermore, as illustrated in FIGS. 12 and 14, even in a case where the same transmission subframe is applied to the cell center terminal and the cell edge terminal, the SRS transmission band can be scheduled without colliding with each other. Accordingly, it is not necessary to divide the transmission subframe at the time of transmitting the SRS, and accordingly, the consumption of the SRS transmission resource can be suppressed.

Third Embodiment

A third embodiment is a modified example of the first embodiment or the second embodiment, and the operation of the terminal in a case where frequency-domain ICIC is performed using an SRS transmission drop resource is different from that of the first or second embodiment.

In a case where the frequency-domain ICIC is performed, in a case where the SRS transmission band in a certain SRS transmission subframe coincides with an SRS drop band according to the first embodiment, or in a case where the SRS transmission band of a certain SRS transmission subframe coincides with the SRS drop band and the interference caused by the terminal is high according to the second embodiment, the terminal does not transmit an SRS. On the other hand, according to the third embodiment, in a case where the SRS transmission band in a certain SRS transmission subframe coincides with the SRS drop band, the SRS transmission band is changed as an SRS drop operation, and an SRS is transmitted.

In this case, a band that does not coincide with the SRS drop band and that is to be mapped in or after the next SRS transmission subframe is set as the SRS transmission band, and the SRS in the SRS transmission subframe at the time of determining that the SRS transmission band coincides with the SRS drop band is transmitted. In other words, in a case where SRSs are sequentially transmitted in a predetermined subframe while frequency hopping is performed in a predetermined hopping pattern, as an SRS transmission band in which frequency hopping is performed in a subframe after that, an SRS is transmitted in the SRS transmission band of the destination of the next frequency hopping that does not coincide with the SRS drop band.

<Configuration and Function of Base Station>

The configuration of a base station (reception apparatus) of a macro cell is similar to that of the second embodiment illustrated in FIG. 10. In the third embodiment, the operation of the channel estimating unit is different from that of the second embodiment.

In FIG. 5, in a case where the channel estimating unit 107 determines that the terminal has dropped the SRS transmission, the channel estimation value of the SRS drop resource is discarded. At this time, the channel estimating unit 107 regards a band that does not coincide with the SRS drop band and is to be mapped after the next SRS transmission subframe as the SRS transmission band, calculates a channel estimation value of the frequency band. Then, the channel estimating unit 107 outputs the calculated channel estimation value to the scheduling unit 108.

Alternatively, in FIG. 10, in a case where the channel estimating unit 207 determines that the terminal has dropped the SRS transmission based on the determination result of the transmission drop determining unit 209, the channel estimation value of the SRS drop resource is discarded. In this case, the channel estimating unit 207 regards a band that does not coincide with the SRS drop band and is to be mapped in or after the next transmission subframe as the SRS transmission band, and calculates a channel estimation value of the frequency band. Then, the channel estimating unit 207 outputs the calculated channel estimation value to the scheduling unit 208.

<Configuration and Function of Terminal>

Figure 17:
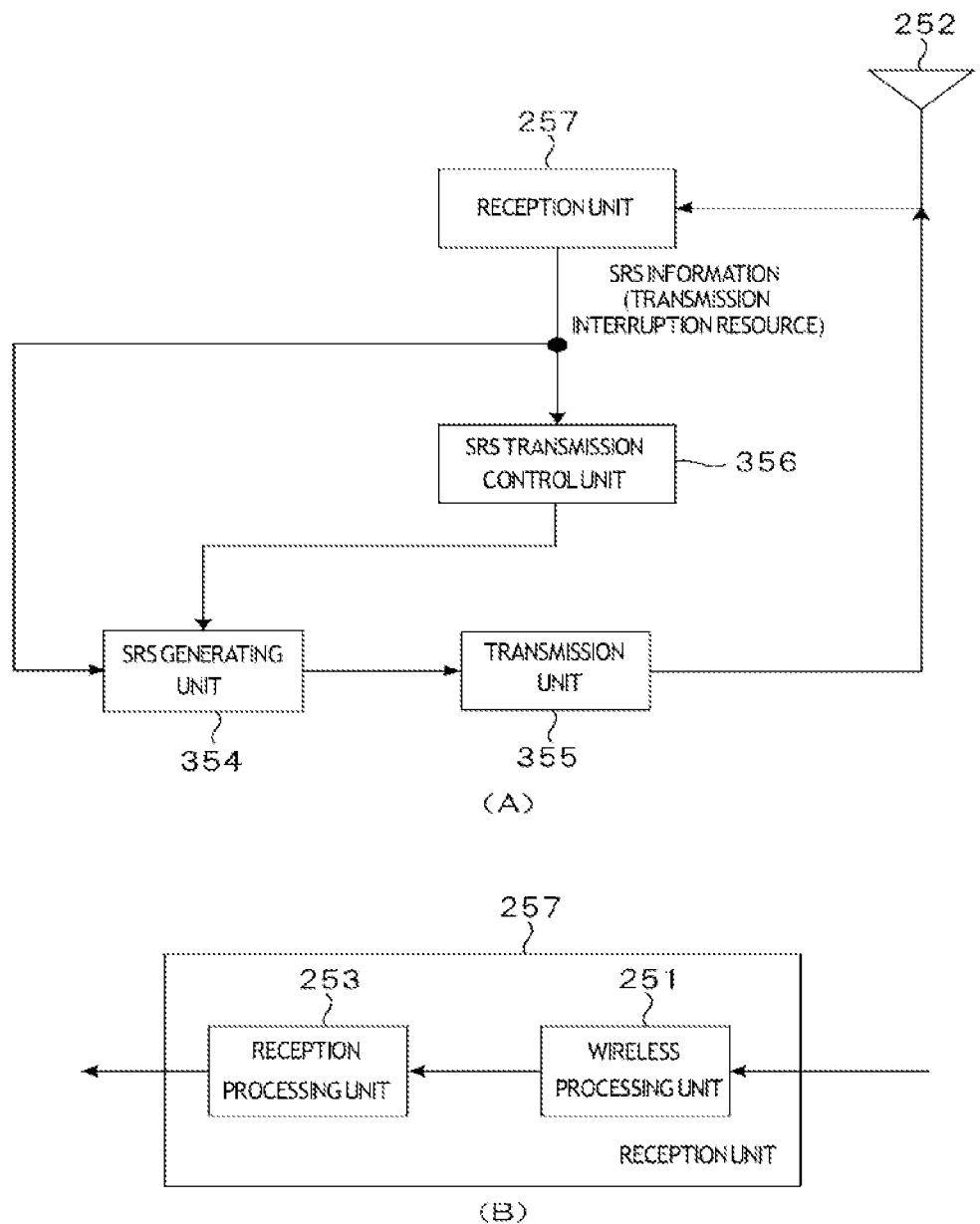
In FIG. 17, (A) and (B) are block diagrams that illustrate a main configuration of a macro terminal (transmission apparatus) according to a third embodiment.

FIG. 17 is a block diagram that illustrates a main configuration of a macro terminal (transmission apparatus) according to the third embodiment. As illustrated in FIG. 17(A), in the macro terminal according to the third embodiment, the operations of an SRS transmission control unit 356, an SRS generating unit 354, and a transmission unit 355 are different from those of the second embodiment illustrated in FIG. 11. Thus, the same reference numeral is assigned to the same constituent element as that of the second embodiment, and the description thereof will not be presented.

The SRS transmission control unit 356 determines whether or not the SRS transmission resource (the SRS transmission band and the SRS transmission subframe) of the macro terminal coincides with the SRS drop resource or whether or not the macro terminal applies the SRS drop and determines whether or not the SRS drop is performed. In addition, the determination method for determining whether the SRS drop is performed is similar to that of the tint embodiment or the second embodiment.

In a case where the SRS transmission resource of the macro terminal is determined to coincide with the SRS drop resource (corresponding to the determination in the first embodiment), or in a case where the SRS transmission resource of the macro terminal is determined to coincide with the SRS drop resource and the above-described macro terminal is in a state having high interference (the path loss between the terminal and the base station is large) from the macro terminal to another cell (corresponding to the determination in the second embodiment), the SRS transmission control unit 356 determines the performance of the SRS drop (the application of the SRS drop in the terminal) and changes (varies) the SRS transmission band.

At this time, the SRS transmission control unit 356 sends an instruction to the SRS generating unit 354 and transmits an SRS in a band other than the SRS drop band. For example, the SRS is transmitted in an SRS transmission band of the next frequency hopping destination that does not coincide with the SRS drop band.

On the other hand, in a case where the SRS transmission resource of the macro terminal is determined not to coincide with the SRS drop resource (corresponding to the determination in the first embodiment), or in a case where the SRS transmission resource of the macro terminal does not coincide with the SRS drop resource or the above-described terminal is determined not to be a terminal that is in a state having high interference (the path loss between the terminal and the base station is large) from the terminal to another cell (corresponding to the determination in the second embodiment), the SRS transmission control unit 356 determines that the SRS drop is not performed and instructs the SRS generating unit 354 so as to transmit the SRS in the normal SRS transmission band.

The SRS generating unit 354 generates an SRS using a predetermined SRS series number (a series number and a CS number) based on the SRS information transmitted from the reception unit 257 and the instruction transmitted from the SRS transmission control unit 356. Then, the SRS generating unit 354 generates a transmission signal by mapping the generated SRS into a predetermined uplink wireless resource (SRS transmission resource).

At this time, in a case where the SRS drop is performed, the SRS generation unit 354 maps the SRS into an SRS transmission band of the next frequency hopping destination except for the SRS drop band and generates a transmission signal. In addition, in a case where the transmission signal is transmitted as an OFDM signal, the SRS generating unit 354 performs an IFFT process for an SRS transmission signal together with other data signals not shown in the drawing, adds a CP, and outputs the signal after the addition of the CP to the transmission unit 355.

The transmission unit 355 may perform a wireless transmission process for the transmission signal including the SRS transmitted from the SRS generating unit 354 in the SRS transmission subframe as is necessary. In addition, the transmission unit 355 performs power amplification for the transmission signal including the SRS so as to have predetermined transmission power and transmits the amplified transmission signal through the antenna 252.

Nevertheless, similar to that of the second embodiment, the macro terminal of the present embodiment can be realized by the macro terminal of the first embodiment as illustrated in FIG. 6. The operations in this case will be described as follows.

The transmission unit 155 determines whether or not the SRS transmission resource (the SRS transmission band and the SRS transmission subframe) of the macro terminal coincides with the SRS drop resource or whether or not the macro terminal applies the SRS drop and determines whether or not the SRS drop is performed. In addition, the determination method for determining whether the SRS drop is performed is similar to that of the first embodiment or the second embodiment.

In a case where the SRS transmission resource of the macro terminal is determined to coincide with the SRS drop resource (corresponding to the determination in the fast embodiment), or in a case where the SRS transmission resource of the macro terminal is determined to coincide with the SRS drop resource and the above-described macro terminal is in a state having high interference (the path loss between the terminal and the base station is large) from the macro terminal to another cell (corresponding to the determination in the second embodiment), the performance of the SRS drop (the application of the SRS drop in the terminal) is determined and the SRS transmission band is changed (varied). At this time, the transmission unit 155 sends an instruction and transmits an SRS in a band other than the SRS drop band. For example, the SRS is transmitted in an SRS transmission band of the next frequency hopping destination that does not coincide with the SRS drop band.

On the other hand, in a case where the SRS transmission resource of the macro terminal is determined not to coincide with the SRS drop resource (corresponding to the determination in the first embodiment), or in a case where the SRS transmission resource of the macro terminal does not coincide with the SRS drop resource or the above-described terminal is determined not to be a terminal that is in a state having high interference (the path loss between the terminal and the base station is large) from the terminal to another cell (corresponding to the determination in the second embodiment), the transmission unit 155 determines that the SRS drop is not performed and transmits the SRS in the normal SRS transmission band.

The SRS generating unit 154 generates an SRS using a predetermined SRS series number (a series number and a CS number) based on the SRS information transmitted from the reception unit 156 and the instruction transmitted from the transmission unit 155. Then, the SRS generating unit 154 generates a transmission signal by mapping the generated SRS into a predetermined uplink wireless resource (SRS transmission resource).

At this time, in a case where the SRS drop is performed, the SRS generation unit 154 maps the SRS into an SRS transmission band of the next frequency hopping destination except for the SRS drop band and generates a transmission signal. In addition, in a case where the transmission signal is transmitted as an OFDM signal, the SRS generating unit 154 performs an IFFT process for an SRS transmission signal together with other data signals not shown in the drawing, adds a CP, and outputs the signal after the addition of the CP to the transmission unit 155.

The transmission unit 155 may perform a wireless transmission process for the transmission signal including the SRS transmitted from the SRS generating unit 154 in the SRS transmission subframe as is necessary. In addition, the transmission unit 155 performs power amplification for the transmission signal including the SRS so as to have predetermined transmission power and transmits the amplified transmission signal through the antenna 152.

<Application Example of SRS Drop>

Here, an operation example for the SRS drop band in a terminal will be described as an application example of the SRS drop according to the third embodiment will be described.

Figure 18:
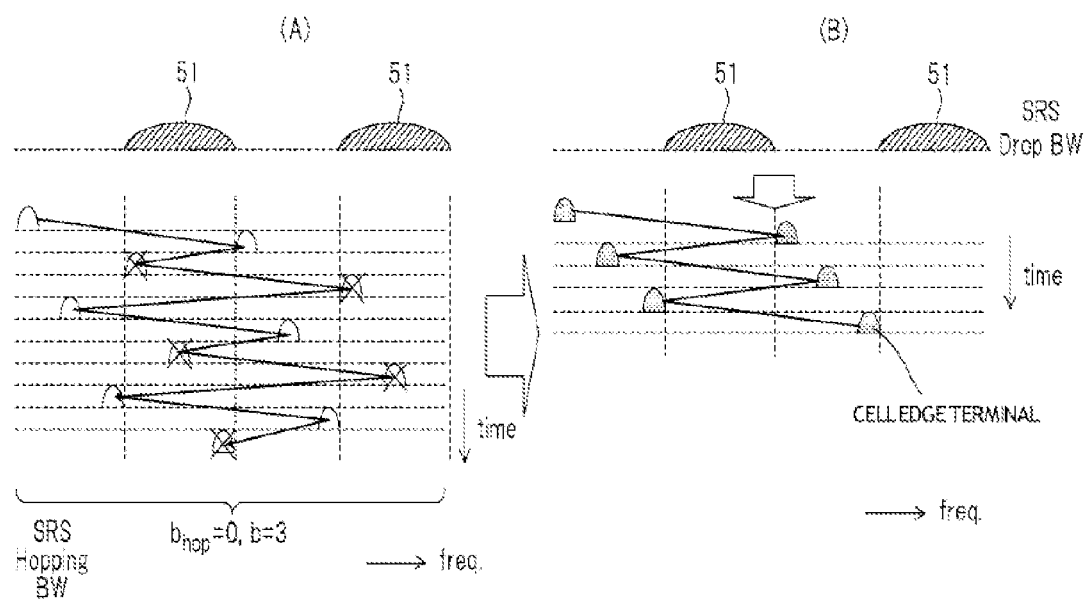
In FIG. 18, (A) and (B) are diagrams that illustrate application examples of a drop of SRS transmission in the frequency domain according to the third embodiment.

FIG. 18 is a diagram that illustrates an application example of the frequency-domain SRS drop according to the third embodiment. The example illustrated in FIG. 18 is a case where an SRS drop band (also referred to as an SRS transmission drop band; SRS Drop BW) 51 that is set in advance is used in the frequency hopping of the SRS illustrated in FIG. 1. In the example illustrated in FIG. 18, while frequency hopping is performed as $b_{hop}=0$ and b=3, SRS drop bands 51 of two non-continuous bands are set, and in the SRS drop band 51, the SRS transmission band is changed to the band of the frequency hopping destination other than the next SRS drop band and the SRS is transmitted.

Accordingly, the SRS can be transmitted in a non-continuous band that is not the SRS drop band 51. FIG. 18(A) illustrates a normal frequency hopping pattern to which the SRS drop is not applied, and FIG. 18(B) illustrates a frequency hopping pattern to which the SRS drop is applied.

In a case where the SRS transmission band is the SRS drop band 51 (corresponding to the first embodiment) or in a case where the SRS transmission band is the SRS drop band 51 and the interference caused by the terminal is high (corresponding to the second embodiment), the terminal stops the SRS transmission in the SRS drop band 51. Here, as an example, whether the SRS drop can be performed is determined based on whether that terminal is a cell edge terminal or a cell center terminal.

As illustrated in FIG. 18(B), in the case of the cell edge terminal, the terminal changes the SRS transmission band in the SRS drop band 51 and transmits an SRS in an SRS transmission band, which is a band of the next frequency hopping destination and is not the SRS drop band 51. In other words, the terminal does not transmit an SRS in the band of the frequency hopping, which is denoted by 'x' in FIG. 18(A), and transmits an SRS in the band of the next frequency hopping destination except for the SRS drop band 51.

As above, the terminal drops the SRS in the SRS drop band that is set in advance by the macro terminal and transmits an SRS in another SRS transmission band other than the SRS drop band, whereby the interference to the pico cell can be reduced. In addition, even in a case where an SRS drop is applied, since the SRS is transmitted in another SRS transmission band, there is no time zone (subframe) in which an SRS is not transmitted, and accordingly, the SRS transmission period does not change. As a result, the drop of channel estimation does not occur due to no transmission of an SRS in the base station, and channel estimation with high accuracy can be performed, whereby the link adaptation (resource allocation, encoding ratio control, and the like) is performed more appropriately.

<Operations of Base Station and Terminal>

Figure 19:
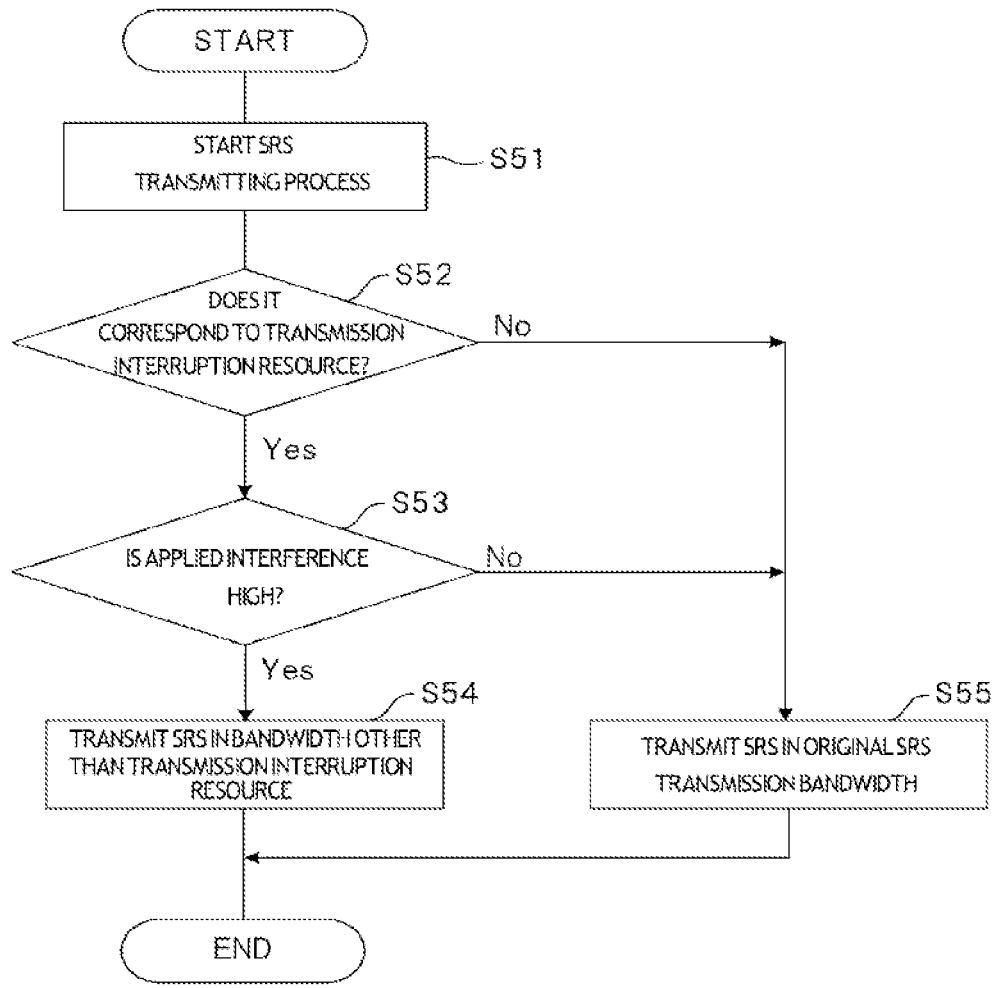
FIG. 19 is a flowchart that illustrates an SRS transmitting operation of the macro terminal according to the third embodiment.
Figure 20:
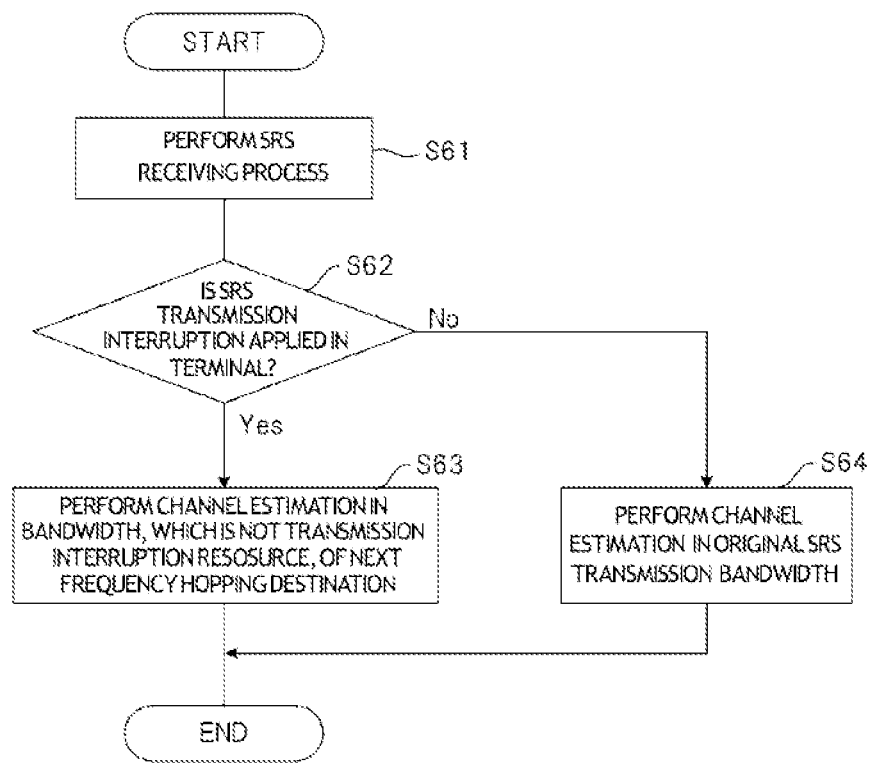
FIG. 20 is a flowchart that illustrates an SRS receiving operation of the base station of the macro cell according to the third embodiment.

Next, the operations of the base station and the terminal relating to the transmission and the reception of an SRS according to the third embodiment will be described. FIG. 19 is a flowchart that illustrates an SRS transmitting operation of the macro terminal according to the third embodiment. FIG. 20 is a flowchart that illustrates an SRS receiving operation of the base station of the macro cell according to the third embodiment.

In the case of FIG. 17, as illustrated in FIG. 19, when the SRS transmitting process is started (Step S51), the SRS transmission control unit 356 determines whether or not the resource for transmitting the SRS is an SRS transmission drop resource (SRS drop resource) based on the SRS information (Step S52). Here, in a case where the above-described resource is an SRS transmission drop resource, the SRS transmission control unit 356 determines whether or not the interference caused by the macro terminal to other cells is high (Step S53).

As described in the second embodiment, in a case where the interference is determined to be high as in a case where the path loss level between the terminal and the base station is large or the like, the SRS transmission control unit 356 instructs the SRS generating unit 354 to stop the SRS transmission and transmits an SRS in a band other than the SRS transmission drop resource (SRS drop band) (Step S54).

In addition, as described in the first embodiment, in a case where the above-described resource is determined to be the SRS transmission drop resource in Step S52, the determination of Step S53 is skipped, and the SRS transmission control unit 356 may proceed to the process of Step S54 in which the SRS generating unit 354 is instructed to stop the SRS transmission and an SRS is transmitted in a band other than the SRS transmission drop resource.

Here, an SRS is transmitted in an SRS transmission band, which does not coincide with the SRS transmission drop resource, of the next frequency hopping destination. In this case, the SRS generating unit 354 generates an SRS and maps the generated SRS into the uplink wireless resource of a band other than the SRS transmission drop resource, and the transmission unit 355 transmits a transmission signal of the SRS at predetermined transmission power to the base station of the macro cell.

On the other hand, in a case where the resource for transmitting the SRS is not the SRS transmission drop resource in Step S52 or in a case where the interference caused by the above-described macro terminal to other cells is not high in Step S53, SRS transmission is performed in the original SRS transmission band (set in advance) (Step S55). In this case, the SRS generating unit 354 generates an SRS based on an instruction from the SRS transmission control unit 356 and maps the generated SRS into the uplink wireless resource of the corresponding SRS transmission band, and the transmission unit 355 transmits a transmission signal of the SRS with predetermined transmission power to the base station of the macro cell.

In the case of FIG. 6, as illustrated in FIG. 19, when the SRS transmitting process is started (Step S51), the transmission unit 155 determines whether or not the resource for transmitting the SRS is an SRS transmission drop resource (SRS drop resource) based on the SRS information (Step S52). Here, in a case where the above-described resource is an SRS transmission drop resource, the transmission unit 155 determines whether or not the interference caused by the macro terminal to other cells is high (Step S53).

As described in the second embodiment, in a case where the interference is determined to be high as in a case where the path loss level between the terminal and the base station is large or the like, the transmission unit 155 instructs the SRS generating unit 154 to stop the SRS transmission and transmits an SRS in a band other than the SRS transmission drop resource (SRS drop band) (Step S54).

In addition, as described in the first embodiment, in a case where the above-described resource is determined to be the SRS transmission drop resource in Step S52, the determination of Step S53 is skipped, and the transmission unit 155 may proceed to the process of Step S54 in which the SRS generating unit 154 is instructed to stop the SRS transmission and an SRS is transmitted in a band other than the SRS transmission drop resource.

Here, an SRS is transmitted in an SRS transmission band, which does not coincide with the SRS transmission drop resource, of the next frequency hopping destination. In this case, the SRS generating unit 154 generates an SRS and maps the generated SRS into the uplink wireless resource of a band other than the SRS transmission drop resource, and the transmission unit 155 transmits a transmission signal of the SRS at predetermined transmission power to the base station of the macro cell.

On the other hand, in a case where the resource for transmitting the SRS is not the SRS transmission drop resource in Step S52 or in a case where the interference caused by the above-described macro terminal to other cells is not high in Step S53, SRS transmission is performed in the original SRS transmission band (set in advance) (Step S55). In this case, the SRS generating unit 154 generates an SRS based on an instruction from the transmission unit 155 and maps the generated SRS into the uplink wireless resource of the corresponding SRS transmission band, and the transmission unit 155 transmits a transmission signal of the SRS with predetermined transmission power to the base station of the macro cell.

In the case of FIG. 5, as illustrated in FIG. 20, the reception unit 109 performs a reception process for receiving an SRS from the macro terminal (Step S61). Then, the channel estimating unit 107 determines whether or not the SRS transmission drop is applied in the terminal (macro terminal) based on the SRS information or the characteristic information of the reception signal (Step S62). Here, in a case where the SRS transmission drop is applied, the channel estimating unit 107 performs channel estimation in the band, which is not the SRS transmission drop resource (SRS drop band), of the next frequency hopping destination (Step S63). Then, the channel estimating unit 107 calculates a channel estimation value in the corresponding frequency band other than the SRS transmission drop resource and outputs the calculated channel estimation value to the scheduling unit 208.

On the other hand, in a case where it is determined that the SRS transmission drop is not applied in the terminal in Step S62, the channel estimating unit 107 performs channel estimation in the original SRS transmission band (set in advance) (Step S64). Then, the channel estimating unit 107 calculates a channel estimation value in the corresponding SRS transmission band and outputs the calculated channel estimation value to the scheduling unit 208.

In the case of FIG. 10, as illustrated in FIG. 20, the reception unit 210 performs a reception process for receiving an SRS from the macro terminal (Step S61). Then, the transmission drop determining unit 209 determines whether or not the SRS transmission drop is applied in the terminal (macro terminal) based on the SRS information or the characteristic information of the reception signal (Step S62). Here, in a case where the SRS transmission drop is determined to have been applied, the transmission drop determining unit 209 transmits an instruction to the channel estimating unit 207, and the channel estimating unit 207 performs channel estimation in the band, which is not the SRS transmission drop resource (SRS drop band), of the next frequency hopping destination (Step S63). Then, the channel estimating unit 20 calculates a channel estimation value in the corresponding frequency band other than the SRS transmission drop resource and outputs the calculated channel estimation value to the scheduling unit 208.

On the other hand, in a case where it is determined that the SRS transmission drop is not applied in the terminal in Step S62, the channel estimating unit 207 performs channel estimation in the original SRS transmission band (set in advance) (Step S64). Then, the channel estimating unit 207 calculates a channel estimation value in the corresponding SRS transmission band and outputs the calculated channel estimation value to the scheduling unit 208.

According to the third embodiment, in the terminal in which the SRS drop is applied, in a case where the SRS transmission band coincides with the SRS drop band or in a case where the SRS transmission resource of the above-described macro terminal is determined to coincide with the SRS drop resource and the macro terminal is determined as a terminal causing high interference with other cells (a path loss between the terminal and the base station is large), an SRS is transmitted in a band that does not coincide with the SRS drop band and that is to be mapped after the next SRS transmission subframe.

Accordingly, the number of subframes in which the SRS transmission is dropped decreases, and accordingly, the SRS transmission rate (SRS transmission period) does not change. In addition, since the number of subframes in which the SRS transmission is dropped decreases, a channel estimation value having high accuracy can be acquired by the base station, and link adaptation using the SRS is appropriately performed.

Fourth Embodiment

As a second example of the countermeasure for the uplink channel interference under the HetNet environment, a case will be described in which time-domain ICIC is applied to the SRS transmitted by the macro terminal.

As methods for canceling the limitation of the set pattern of the transmission resource at the time of performing ICIC, in the time-domain ICIC, for example, there are the following methods.

Figure 21:
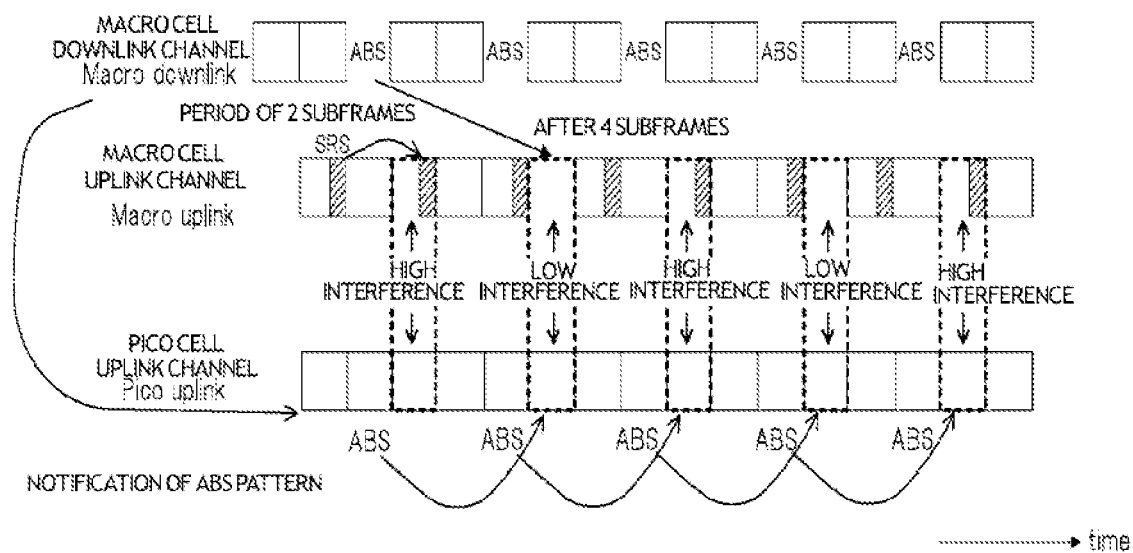
FIG. 21 is a diagram that illustrates an application example of time-domain ICIC in SRS transmission.

FIG. 21 is a diagram that illustrates an application example of time-domain ICIC in SRS transmission. In this example, it is observed that a subframe after four subframes from a downlink ABS is regarded as an uplink ABS, and the time-domain ICIC of the uplink channel can be performed.

Since a downlink signal cannot be transmitted in the downlink ABS, the base station cannot transmit a scheduling control signal (UL Grant) used for transmitting an uplink data signal (PUSCH) to the terminal. Here, a terminal transmits the uplink data signal (PUSCH) to the base station after four subframes when the terminal receives the scheduling control signal (UL Grant), which is implemented as an LTE specification. Accordingly, in the macro cell, after four subframes from the downlink ABS in which the scheduling control signal (UL Grant) is not transmitted, the transmission of the uplink data signal (PUSCH) is not performed by the macro terminal and the interference with the pico cell decreases.

Accordingly, in the pico cell, it is assumed that the uplink channel interference decreases after four subframes from the downlink ABS, and, by transmitting the uplink data signal (PUSCH) of the pico cell at a high rate in the subframe, the throughput can be improved. In other words, a subframe after four subframes from the downlink ABS is regarded as an uplink ABS, and the pico cell can be used.

However, the SRS transmission of the macro terminal is not triggered in accordance with the scheduling control signal (UL Grant), and even after four subframes (hereinafter, referred to as an uplink ABS) from the downlink ABS, there is a possibility that an SRS is transmitted at transmission timing that is determined in advance. Accordingly, in a case where it is not known whether the base station of the pico cell has SRS transmission of the macro terminal in the uplink ABS, the interference level of the uplink ABS in the pico cell cannot be accurately estimated. Accordingly, there is a case where the link adaptation of the uplink data signal (PUSCH) is not appropriately operated, and the effect of the improvement of the throughput of the pico cell through the ICIC decreases.

In FIG. 21, an example is illustrated in which the downlink ABS of the macro cell is set at the period of three subframes, and the SRS transmission period of the macro terminal is set as the period of two subframes. The base station of the pico cell regards, after four subframes from the downlink ABS, an uplink ABS in which there is low interference from the macro cell, and the uplink data signal (PUSCH) of the pico cell in the uplink ABS is scheduled at a high rate. However, as illustrated in the drawing, there is a case where an SRS is transmitted from the macro terminal also in the uplink ABS, and accordingly, the macro cell causes high interference with the uplink data signal (PUSCH) of the pico cell.

The fourth embodiment illustrates an operation example in a case where the time-domain ICIC is performed by using the SRS transmission drop resource. In this embodiment, a predetermined subframe in the time domain is set as the SRS drop resource.

<Configuration and Function of Base Station>

The configuration of the base station (reception apparatus) of the macro cell is similar to that illustrated in FIG. 5 or FIG. 10. In the fourth embodiment, the operation of the SRS information determining unit 201 (or the SRS information determining unit 101) is different from that of the above-described operation.

The SRS information determining unit 201 (or the SRS information determining unit 101) determines an SRS drop resource that drops the SRS transmission as one piece of the SRS information. Here, the SRS information determining unit 201 (or the SRS information determining unit 101) sets the SRS drop resource as a subframe after four subframes from the downlink ABS.

<Configuration and Function of Terminal>

The configuration of the macro terminal (transmission apparatus) is similar to that of the second embodiment illustrated in FIG. 11. In the fourth embodiment, the operation of the SRS transmission control unit 256 is different from that of the above-described SRS transmission control unit.

The SRS transmission control unit 256 specifies a subframe after four subframes from a downlink ABS as an SRS drop resource and performs an operation that is similar to that of the second embodiment. In this case, the SRS transmission control unit 256 determines whether or not the SRS transmission subframe of the macro terminal coincides with the SRS drop resource (after four frames from the downlink ABS) and determines whether or not the SRS drop is performed (corresponding to the determination according to the first embodiment).

Alternatively, in a case where the SRS transmission subframe of the macro terminal is determined to coincide with the SRS drop resource (after four subframes from the downlink ABS) and the interference caused by the above-described terminal is determined to be high (corresponding to the determination in the second embodiment), the SRS transmission control unit 256 determines that the SRS drop is performed.

In a case where the SRS drop (the application of the SRS drop in the terminal) is determined to be performed, the SRS transmission control unit 256 outputs an instruction for dropping the SRS transmission to the transmission unit 255. On the other hand, in a case where the SRS drop is not performed, the SRS transmission control unit 256 outputs an instruction for transmitting an SRS as in a normal case to the transmission unit 255.

In addition, based on the instruction for performing or not performing the SRS drop which is transmitted from the SRS transmission control unit 256, the SRS generating unit 254 may generate an SRS in a case where the SRS is not dropped and not generate an SRS in a case where the SRS is dropped. Alternatively, the SRS generating unit 254, based on the instruction for performing or not performing the SRS drop which is transmitted from the SRS transmission control unit 256, may map the generated SRS into the SRS transmission resource in a case where the SRS is not dropped and not map the generated SRS into the SRS transmission resource in a case where the SRS is dropped.

In addition, the configuration of the macro terminal (transmission apparatus) is similar to that of the second embodiment and the third embodiment, and can be realized by a configuration similar to the macro terminal of the first embodiment illustrated in FIG. 6. The operations in this case will be described as follows.

The transmission unit 155 specifies a subframe after four subframes from a downlink ABS as an SRS drop resource, determines whether or not the SRS transmission subframe of the macro terminal coincides with the SRS drop resource (after four frames from the downlink ABS) and determines whether or not the SRS drop is performed (corresponding to the determination according to the first embodiment).

Alternatively, in a case where the transmission unit 155 determines that the SRS transmission subframe of the macro terminal coincide with the SRS drop resource (after four subframes from the downlink ABS) and the interference caused by the above-described terminal is determined to be high (corresponding to the determination in the second embodiment), it is determined that the SRS drop is performed.

In a case where the SRS drop (the application of the SRS drop in the terminal) is determined to be performed, the transmission unit 155 drops the SRS transmission. On the other hand, in a case where the SRS drop is not performed, the transmission unit 155 transmits an SRS as in a normal case.

In addition, based on the instruction for performing or not performing the SRS drop which is transmitted from the transmission unit 155, the SRS generating unit 154 may generate an SRS in a case where the SRS is not dropped and not generate an SRS in a case where the SRS is dropped. Alternatively the SRS generating unit 154, based on the instruction for performing or not performing the SRS drop which is transmitted from the transmission unit 155, may map the generated SRS into the SRS transmission resource in a case where the SRS is not dropped and not map the generated SRS into the SRS transmission resource in a case where the SRS is dropped.

The downlink ABS may be explicitly informed from the base station of the macro cell to the macro cell, or the macro terminal may estimate the downlink ABS based on other informed parameters without explicitly informing the downlink ABS.

Here, in a case where the macro terminal does not explicitly inform the downlink ABS from the base station of the macro cell, the macro terminal estimates a downlink ABS based on other parameters relating to the downlink ABS. For example, the terminal can estimate a downlink ABS by using two parameters "csi-SubframeSet1 and csi-SubframeSet2" (see 3GPP TS 36.331) that indicate subframe patterns for measuring CSI (Channel Station Information).

One of these two parameters is used for measuring the channel quality in the downlink ABS, and the other is used for measuring the channel quality in a normal subframe (other than the ABS). Accordingly, the macro terminal can estimate one of the subframe patterns csi-SubframeSet1 and csi-SubframeSet2 (for example, one having better channel quality) as a downlink ABS pattern.

In addition, the macro terminal may estimate a downlink ABS pattern by using "MeasSubframePattern" (see 3GPP TS 36.331) as a parameter that indicates a subframe pattern as a target for measuring the reception level (a value that is periodically reported to the base station by the terminal) of the downlink reference signal.

<Application Example of SRS Drop>

Figure 22:
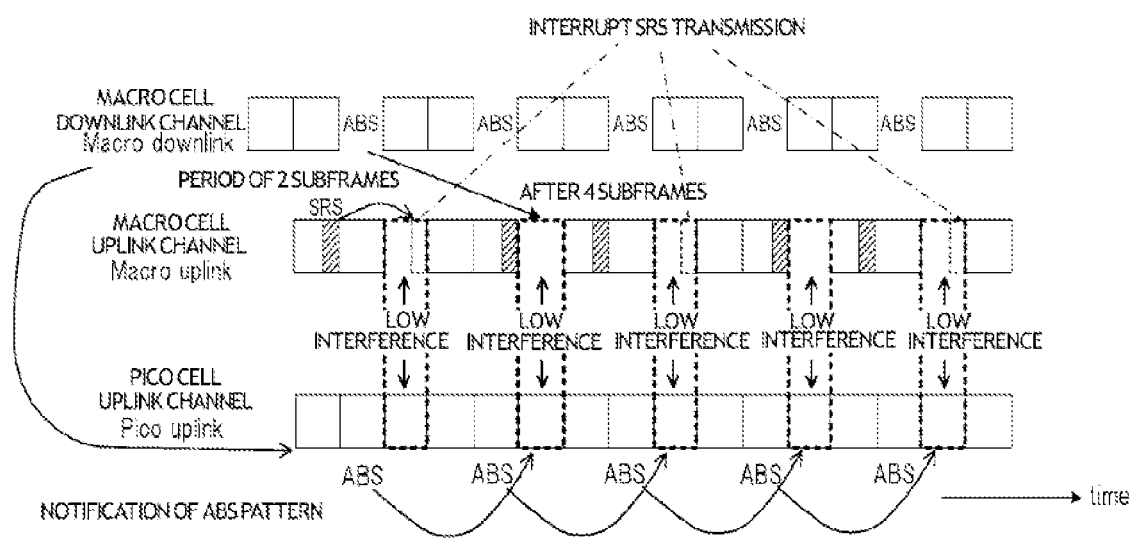
FIG. 22 is a diagram that illustrates an application example of time-domain SRS transmission drop according to a fourth embodiment.

FIG. 22 is a diagram that illustrates an application example of the time-domain SRS drop according to the fourth embodiment. The example illustrated in FIG. 22 represents a case where the downlink ABS of the macro cell is set at the period of three subframes, and the SRS transmission period of the macro terminal is set at the period of two subframes. After four subframes from the downlink ABS of the macro cell is regarded as an SRS drop resource, and the uplink ABS is set, and the macro terminal does not transmit an SRS in the uplink ABS. Accordingly, the interference from the macro cell in the subframe in which the SRS transmission is stopped can be decreased.

In a pico cell, the interference of the macro cell decreases after four subframes from the downlink ABS all the time, and accordingly, the link adaptation of the uplink data signal (PUSCH) can be appropriately performed in the base station of the pico whereby the effect of the improvement of the throughput of the pico cell through the ICIC can be improved.

In the fourth embodiment, the SRS drop resource is set after four subframes from the downlink ABS of the macro cell, and in a subframe that coincides with the SRS drop resource or in a case where the interference of the above-described terminal is high in a subframe that coincides with the SRS drop resource, the transmission of an SRS is dropped. Accordingly, the terminal can determine a transmission drop subframe of the SRS without explicitly being informed from the base station, and the uplink channel interference from the Macro cell can be reduced in the subframe to which the SRS drop is applied.

In addition, in each embodiment described above, the base station and the terminal in the macro cell that applies interference to the pico cell have been described. However, even in a case where the base station and the terminal are substituted with a base station and a terminal in a pico cell that applies interference to the macro cell, the same function can be implemented. In other words, in each embodiment described above, although an operation in which an SRS is dropped in the macro cell is assumed, and the configuration of the base station of the macro cell and the macro terminal is employed, even in a case where an operation in which an SRS is dropped in a pico cell is assumed, and the configuration of the base station of the pico cell and the pico terminal is employed, it can be similarly applied.

Furthermore, in each embodiment described above, a case has been described in which the terminal itself determines whether or not the SRS drop is applied to the terminal. However, even by employing a configuration in which the determination of whether the SRS drop is applied is performed by the base station, and the information of the determination result is informed to the terminal, equivalent advantages can be acquired. In this case, the application of the SRS drop can be selected based on the uplink signal level such as a case in which, for example, the base station drops a terminal of which the interference level for the pico cell is estimated to be high based on the level of the uplink signal transmitted from the terminal.

In addition, in each embodiment described above, although the description has been presented by assuming a periodic SRS (an SRS that is periodically transmitted), the same can be applied to an aperiodic SRS (an SRS that is stimulated to be transmitted on a trigger base). In other words, also in the aperiodic SRS, the terminal drops the aperiodic SRS in a case where the SRS transmission resource after trigger is an SRS drop resource, and the terminal is a terminal to which the SRS drop is applied. Accordingly, by appropriately limiting the resources for SRS transmission using the SRS drop resource, the uplink channel interference can be reduced.

Furthermore, in each embodiment described above, although an example of the SRS as the reference signal has been described, the same can be applied to another reference signal that is transmitted at predetermined timing such as a DMRS (Demodulation Reference Signal), an uplink data signal to which semi-persistent scheduling determining the transmission resource (the transmission band and the transmission timing) of the terminal in advance is applied, or a control signal.

In addition, the application is not limited to the uplink channel but can be applied to a downlink channel, and similar advantages can be acquired. In other words, the application is not limited to a case in which the transmission apparatus is the terminal and the reception apparatus is the base station, but the transmission apparatus and the reception apparatus may be applied to any of the terminal and the base station like a case where the transmission apparatus is the base station, and the reception apparatus is the terminal.

Furthermore, in a case where the time-domain ICIC is applied, the signal is not limited to the SRS, but another signal may be used as long as it can be transmitted in a subframe that is regarded as an uplink ABS. Thus, not only a periodic SRS or an aperiodic SRS, but also a signal that is periodically transmitted and is mapped into a subframe that is regarded as an uplink ABS can be used.

In addition, the present invention intends to be variously changed or modified by those skilled in the art based on the description presented in the specification and known technologies without departing from the content and the scope of the present invention, and such changes and applications belong to the scope that claimed to be protected. Furthermore, in a range not departing from the content of the invention, the constituent elements of the above-described embodiments may be arbitrarily combined.

In each embodiment described above, although the configuration using hardware has been described as an example, the present invention can be realized by software in cooperation with hardware.

In addition, each functional block used in the description of each embodiment described above is typically realized by an LSI as an integrated circuit. These may be individually formed as chips, or one chip may be formed so as to include a part or all of the functional blocks. Here, although the LSI has been described, it may be referred to as an IC, a system LSI, a super LSI, or an ultra LSI depending on a difference in the degree of integration.

Furthermore, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

In addition, the calculation of each functional block can be performed by using calculating means, for example, including a DSP or a CPU. In addition, the processing step of each function may be recorded on a recording medium as a program for execution.

Furthermore, when a technology for implementing an integrated circuit that substitutes the LSI appears in accordance with the advancement of the semiconductor technology or other derivative technologies, it is apparent that the functional block may be integrated by using such technologies. The present invention may also be applied to technologies for replacing LSI that emerges with the development of the biological technology.

The present application is based upon and claims the benefit of Japanese patent application No. 2011-203547 filed on Sep. 16, 2011, the contents of which are incorporated by reference in its entirety.

INDUSTRIAL APPLICABILITY

The present invention is useful as a wireless transmission apparatus, a wireless reception apparatus, a wireless communication method, and the like that have an advantage of improving the effect of the application of ICIC by appropriately limiting resources of a reference signal and can be applied to a wireless communication system such as a cellular system.

REFERENCE SIGNS LIST

10: MACRO CELL
11: MACRO TERMINAL
11A: CELL EDGE TERMINAL
11B: CELL CENTER TERMINAL
12: BASE STATION (MACRO CELL)
20: PICO CELL
21: PICO TERMINAL
22: BASE STATION (PICO CELL)
51: SRS DROP BAND
101, 102: SRS INFORMATION DETERMINING UNIT
102, 202: TRANSMISSION PROCESSING UNIT
110, 155, 211, 255, 355: TRANSMISSION UNIT
104, 152, 204, 252: ANTENNA
103, 105, 151, 203, 205, 251: WIRELESS PROCESSING UNIT
106, 153, 206, 253: RECEPTION PROCESSING UNIT
107, 207: CHANNEL ESTIMATING UNIT
108, 208: SCHEDULING UNIT
109, 156, 210, 257: RECEPTION UNIT
154, 254, 354: SRS GENERATING UNIT
209: TRANSMISSION DROP DETERMINING UNIT
256, 356: SRS TRANSMISSION CONTROL UNIT

The invention claimed is:

1. A wireless transmission apparatus, comprising:
a reception unit configured to receive information representing a transmission drop resource, that has been set, during which the wireless transmission apparatus is designated to drop transmission of a reference signal;
a reference signal generating unit configured to generate the reference signal; and
a transmission unit configured to transmit the reference signal in a transmission resource that is not the transmission drop resource among one or more transmission resources used for transmitting the reference signal, wherein,
in the transmission drop resource among the one or more transmission resources, the transmission unit drops the transmission of the reference signal in the transmission drop resource, when it is determined that an interference caused by the wireless transmission apparatus is high based on a determination criterion.

2. The wireless transmission apparatus according to claim 1, wherein
the determination criterion defines that the interference caused by the wireless transmission apparatus is determined to be high when a transmission bandwidth of the reference signal of the wireless transmission apparatus is below a threshold value.

3. The wireless transmission apparatus according to claim 2, wherein
the transmission drop resource is a transmission drop band that represents a frequency band in which transmission of the reference signal is to be dropped, the threshold value is derived from a bandwidth of the transmission drop band.

4. The wireless transmission apparatus according to claim 1, wherein
the determination criterion defines that the interference caused by the wireless transmission apparatus is determined to be high when the wireless transmission apparatus is located in a cell edge area.

5. The wireless transmission apparatus according to claim 1, wherein
the determination criterion defines that the interference caused by the wireless transmission apparatus is determined to be high when a path loss between the wireless transmission apparatus and a wireless reception apparatus is above a threshold value.

6. The wireless transmission apparatus according to claim 1, wherein
the determination criterion defines that the interference caused by the wireless transmission apparatus is determined to be high when a power headroom of a transmission signal of the wireless transmission apparatus is below a threshold value.

7. A wireless transmission apparatus, comprising
a reception unit configured to receive information representing a transmission drop resource, that has been set, during which the wireless transmission apparatus is designated to drop transmission of a reference signal;
a reference signal generating unit configured to generate the reference signal; and
a transmission unit configured to transmit the reference signal in a transmission resource that is not the transmission drop resource among one or more transmission resources used for transmitting the reference signal, wherein
the transmission drop resource is a transmission drop band that represents a frequency band in which transmission of the reference signal is to be dropped or a transmission drop subframe that represents a subframe in which the transmission of the reference signal is to be dropped, and
the transmission drop band is represented by a bit sequence indicative of a position of a transmission band that is available for the wireless transmission apparatus.

8. A wireless transmission apparatus, comprising:
a reception unit configured to receive information representing a transmission drop resource, that has been set, during which the wireless transmission apparatus is designated to drop transmission of a reference signal;
a reference signal generating unit configured to generate the reference signal; and
a transmission unit configured to transmit the reference signal in a transmission resource that is not the transmission drop resource among one or more transmission resources used for transmitting the reference signal, wherein,
the transmission unit transmits the reference signal in a second transmission band which is a transmission band that is assigned after a transmission subframe of a next reference signal and does not coincide with the transmission drop band, in a case where a first transmission band for the reference signal coincides with a transmission drop band as the transmission drop resource that represents a frequency band in which the transmission of the reference signal is dropped or in a case where the first transmission band for the reference signal coincides with the transmission drop band and an interference caused by the wireless transmission apparatus is determined to be high based on a determination criterion.

9. A wireless transmission apparatus, comprising
a reception unit configured to receive information representing a transmission drop resource, that has been set, during which the wireless transmission apparatus is designated to drop transmission of a reference signal;
a reference signal generating unit configured to generate the reference signal; and
a transmission unit configured to transmit the reference signal in a transmission resource that is not the transmission drop resource among one or more transmission resources used for transmitting the reference signal, wherein
the transmission drop resource is a transmission drop band that represents a frequency band in which transmission of the reference signal is to be dropped or a transmission drop subframe that represents a subframe in which the transmission of the reference signal is to be dropped, and
the transmission drop subframe is a subframe that is after four subframes from a downlink ABS (Almost Blank Subframe).

10. A wireless reception apparatus, comprising
a reception unit configured to receive a reference signal; and
a channel estimating unit configured to perform a channel estimation by using the received reference signal, when a transmission resource that is used for a transmission of the reference signal is not a transmission drop resource, that has been set, during which a wireless transmission apparatus is designated to drop transmission of the reference signal, wherein,
the channel estimating unit drops the channel estimation when the transmission resource is the transmission drop resource and an interference caused by a wireless transmission apparatus is determined to be high based on a determination criterion.

11. The wireless reception apparatus according to claim 10, further comprising:
a transmission unit configured to transmit a transmission drop information indicating a drop of the transmission of the reference signal in the transmission drop resource to the wireless transmission apparatus.

* * * * *